US009569702B2

(12) United States Patent
Ishikawa et al.

(10) Patent No.: US 9,569,702 B2
(45) Date of Patent: Feb. 14, 2017

(54) CARD READER

(71) Applicant: NIDEC SANKYO CORPORATION, Nagano (JP)

(72) Inventors: Kazutoshi Ishikawa, Nagano (JP); Kazunori Takahashi, Nagano (JP); Jo Tanaka, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 14/382,019

(22) PCT Filed: Sep. 27, 2013

(86) PCT No.: PCT/JP2013/076318
§ 371 (c)(1),
(2) Date: Aug. 29, 2014

(87) PCT Pub. No.: WO2014/051074
PCT Pub. Date: Apr. 3, 2014

(65) Prior Publication Data
US 2015/0213334 A1 Jul. 30, 2015

(30) Foreign Application Priority Data

Sep. 28, 2012 (JP) .................. 2012-216447
Sep. 28, 2012 (JP) .................. 2012-216448
Sep. 28, 2012 (JP) .................. 2012-216449

(51) Int. Cl.
*G06K 13/08* (2006.01)
*G06K 7/00* (2006.01)
*G06K 7/08* (2006.01)

(52) U.S. Cl.
CPC ......... *G06K 13/0875* (2013.01); *G06K 7/0013* (2013.01); *G06K 7/0026* (2013.01);
(Continued)

(58) Field of Classification Search
USPC .......................... 235/449, 475, 379
See application file for complete search history.

(56) References Cited

U.S. PATENT DOCUMENTS 6,324,064 B1* 11/2001 Schneider ............ G06K 7/0021
361/737
2001/0019077 A1* 9/2001 Buschmann ......... G06K 7/0013
235/439

(Continued)

FOREIGN PATENT DOCUMENTS

JP H09128872 A 5/1997
JP H1185916 A 3/1999
(Continued)

OTHER PUBLICATIONS

International Search Report for Application PCT/JP2013/076318; date of mailing, Dec. 24, 2013; with English Translation.

*Primary Examiner* — Allyson Trail
(74) *Attorney, Agent, or Firm* — Cantor Colburn LLP

(57) ABSTRACT

A card reader may include a card insertion part which is formed with an insertion port for the card; and a conveying passage for the card which is connected with the insertion port. The card insertion part may include a shutter member disposed on a rear side with respect to the insertion port is movable between a closed position an open position; and a protruding member which is attached to the shutter member and is protruded from the shutter member to an insertion port side. An insertion port side of the protruding member may be formed with a card abutting face. A distance between the insertion port and the card abutting face in a conveying direction of the card may be set to be shorter than a width in the short widthwise direction of the card.

24 Claims, 13 Drawing Sheets

(52) U.S. Cl.
CPC ............ *G06K 7/082* (2013.01); *G06K 7/084* (2013.01); *G06K 13/0881* (2013.01)

(56) References Cited

U.S. PATENT DOCUMENTS

| | | | | |
|---|---|---|---|---|
| 2004/0094629 A1* | 5/2004 | Hirasawa | ............... | B65H 9/101 235/479 |
| 2011/0006118 A1* | 1/2011 | Mizawa | ............. | G06K 13/0875 235/483 |
| 2011/0084137 A1* | 4/2011 | Takeuchi | ............... | G06K 13/08 235/437 |
| 2011/0240738 A1* | 10/2011 | Mizawa | ............. | G06K 13/0887 235/449 |
| 2014/0217169 A1* | 8/2014 | Lewis | ................... | G07F 19/201 235/379 |

FOREIGN PATENT DOCUMENTS

| | | | |
|---|---|---|---|
| JP | 2009176078 A | 8/2009 | |
| JP | 2010160665 A | 7/2010 | |
| JP | 2010160666 A | 7/2010 | |

* cited by examiner

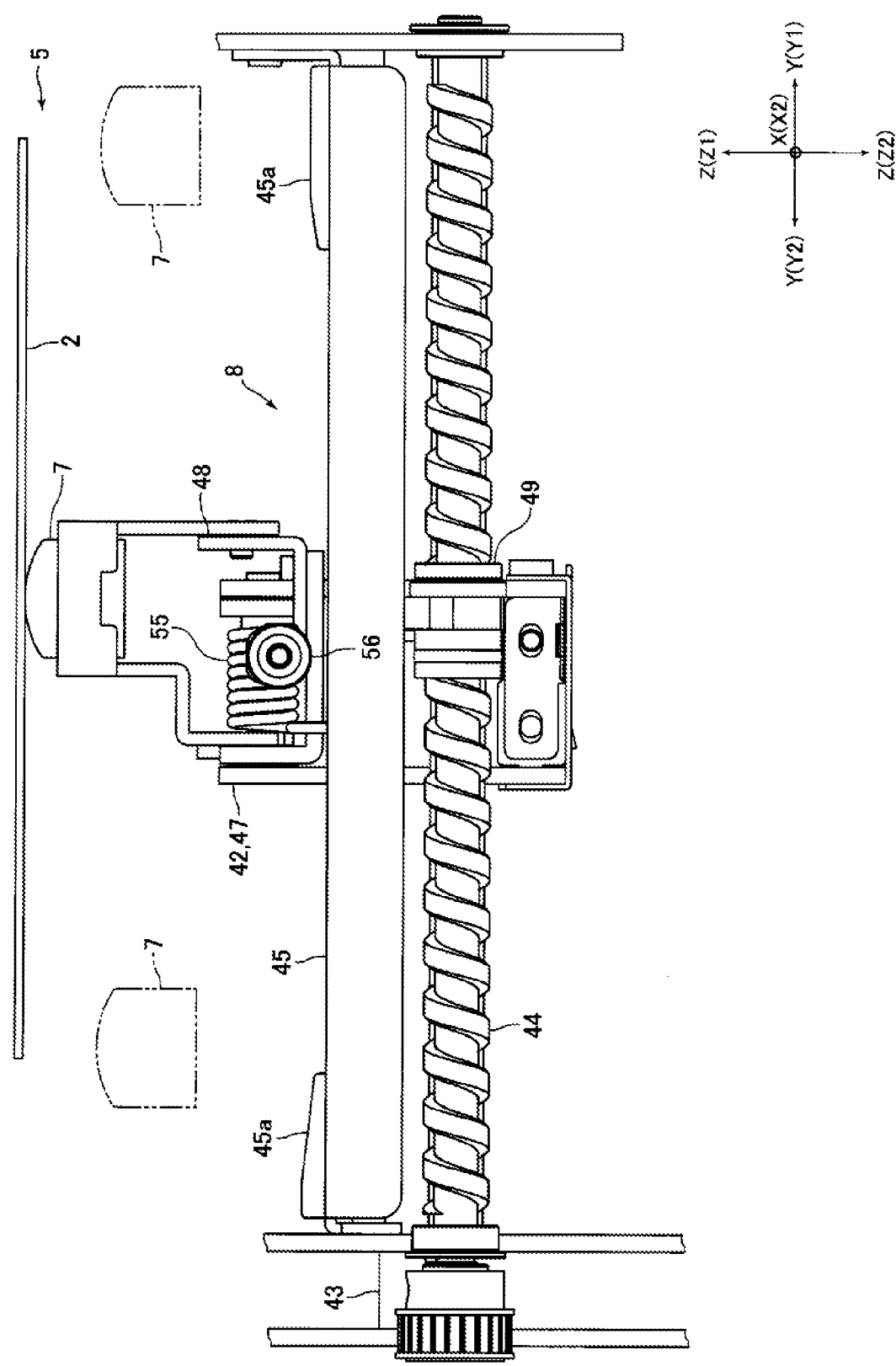

Fig. 6(A)
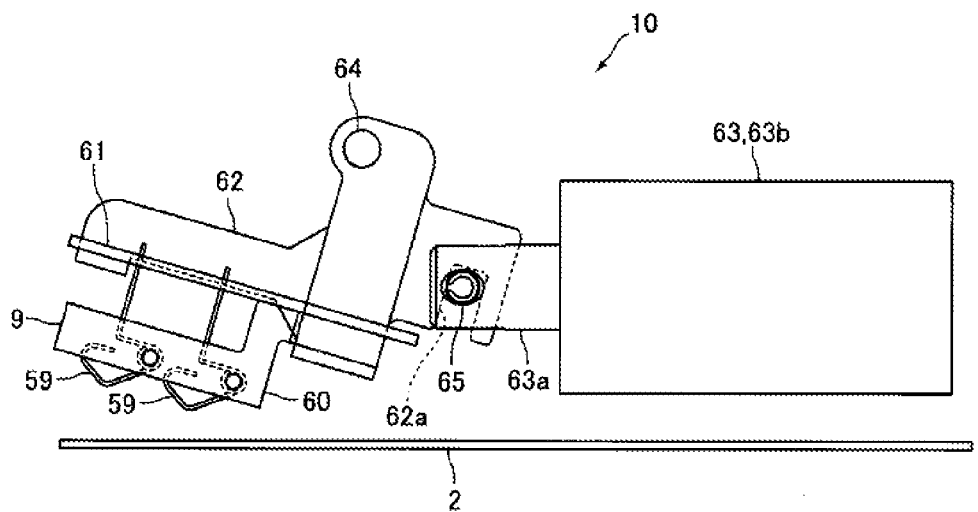
Fig. 6(B)
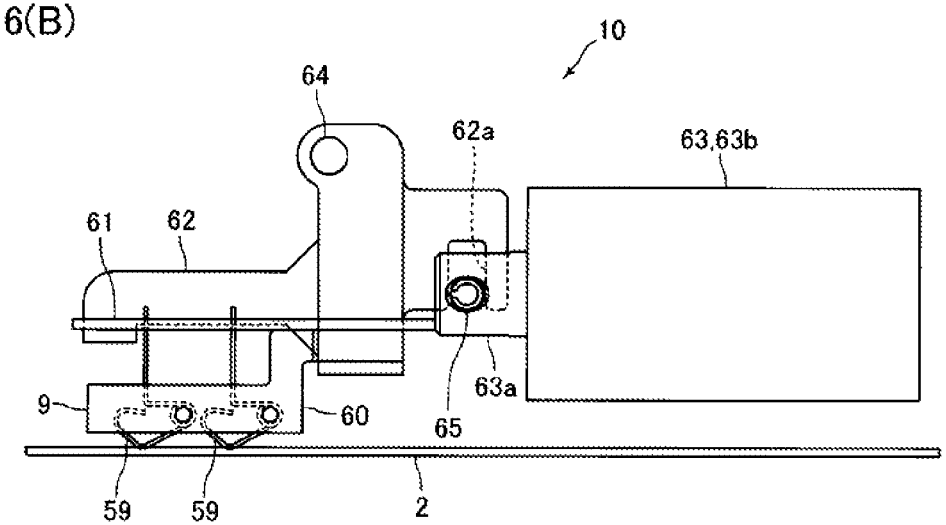
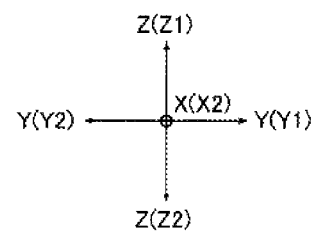

Fig. 7
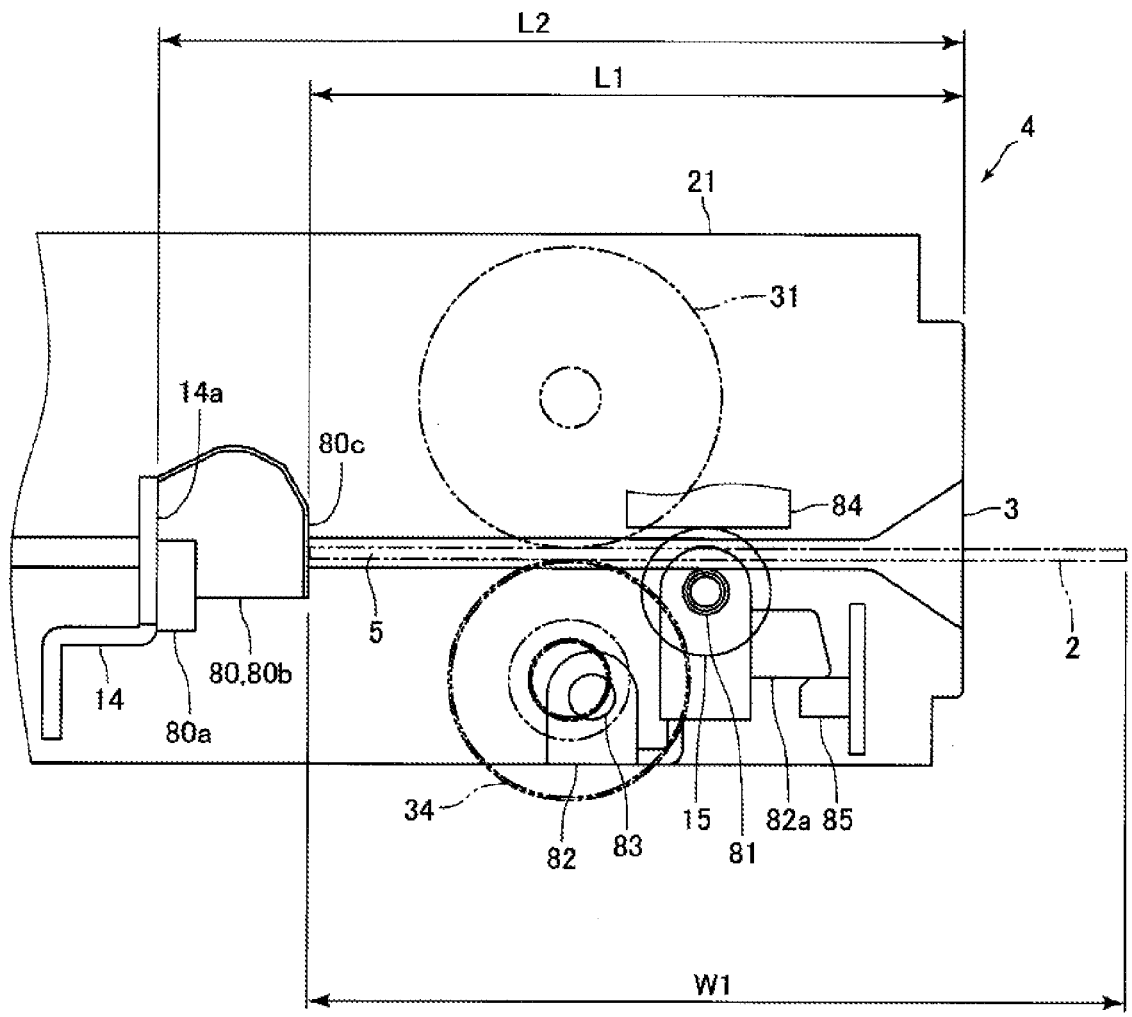
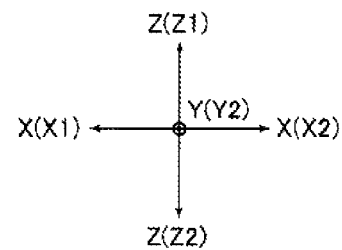

Fig. 8
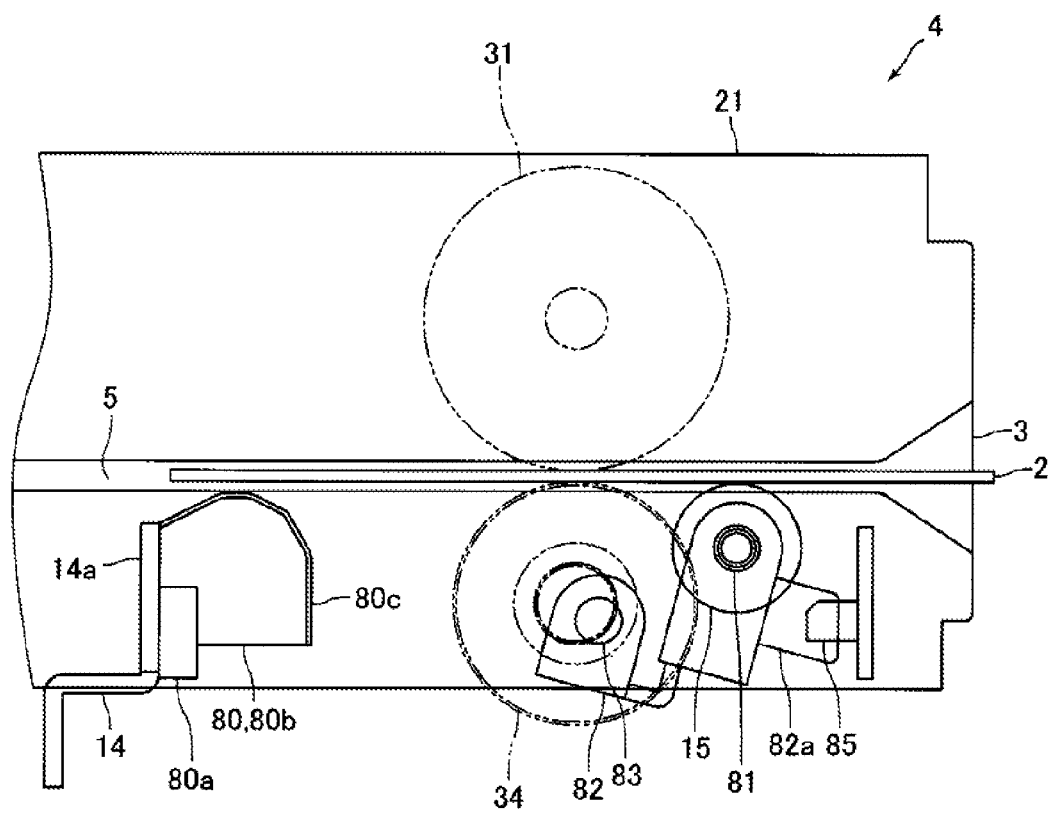
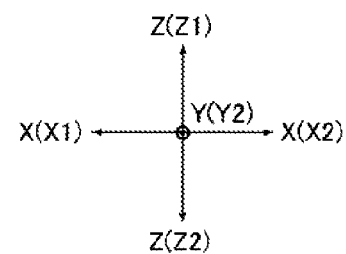

Fig. 9
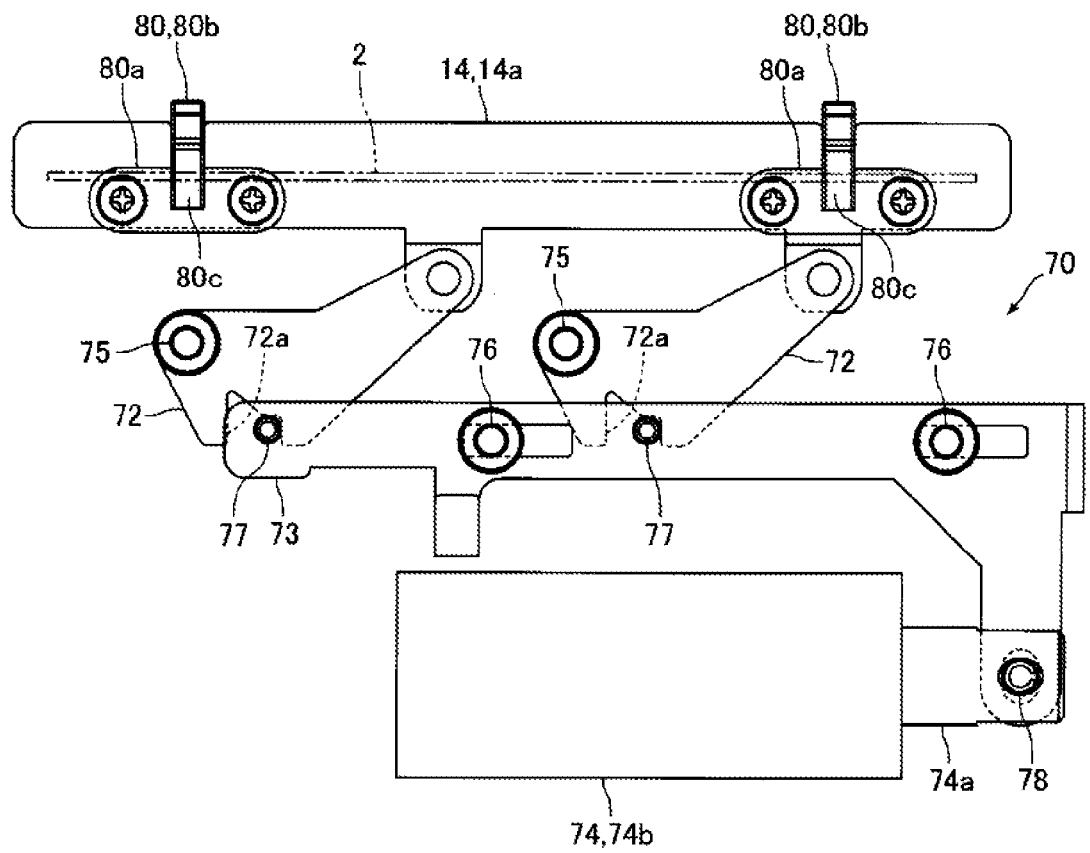
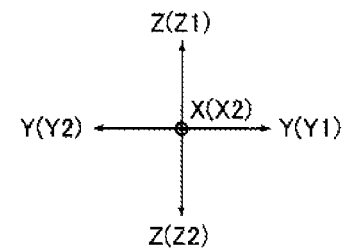

Fig. 10
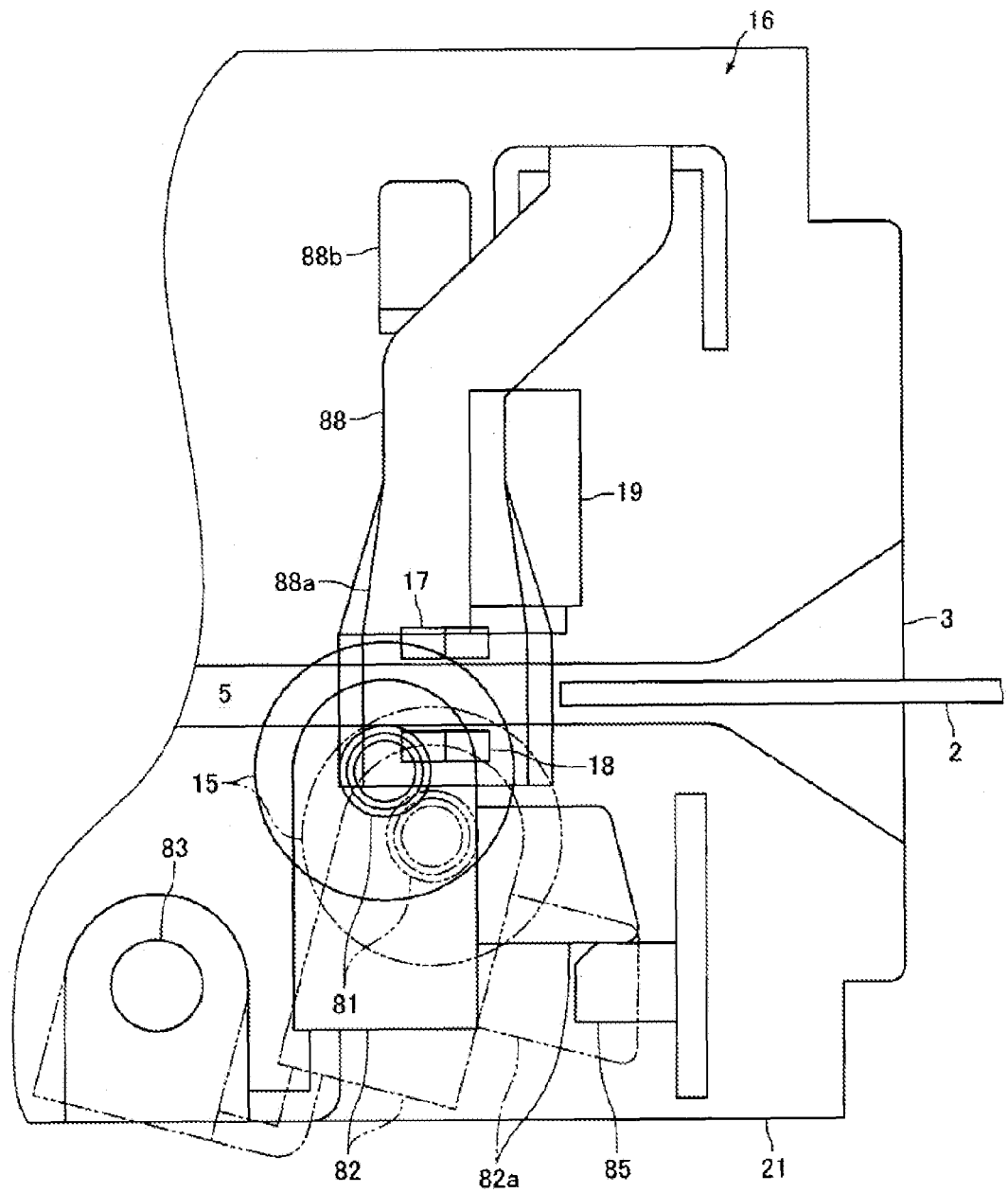
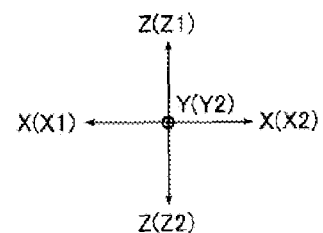

Fig. 13
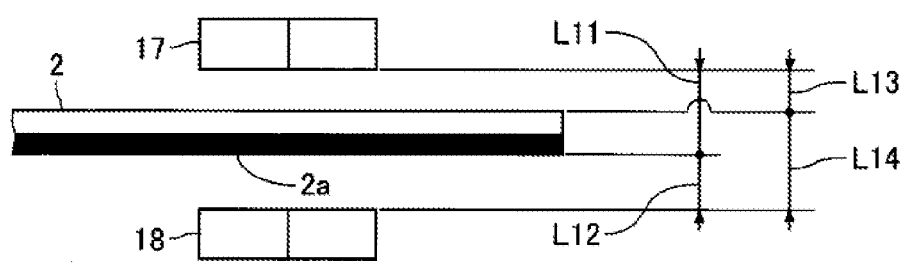
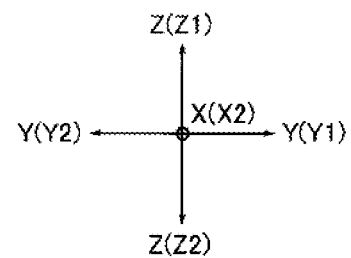

CARD READER

CROSS REFERENCE TO RELATED APPLICATIONS

This is the U.S. national stage of application No. PCT/JP2013/076318 filed on 27 Sep. 2013. Priority under 35 U.S.C. §119(a) and 35 U.S.C. §365(b) is claimed from Japanese Application No. 2012-216449, filed 28 Sep. 2012; Japanese Application No. 2012-216447, filed 28 Sep. 2012; and Japanese Application No. 2012-216448, filed 28 Sep. 2012; the disclosure of which are also incorporated herein by reference.

FIELD OF THE INVENTION

The present invention relates to a card reader which conveys a card formed in a substantially rectangular shape in its short widthwise direction for processing.

BACKGROUND

Conventionally, a magnetic head moving type magnetic stripe reading/writing device has been known in which reading of magnetic data from a magnetic stripe formed on a magnetic medium and writing of magnetic data to the magnetic stripe are performed (see, for example, Patent Literature 1). In a magnetic medium which is to be processed in the magnetic stripe reading/writing device described in Patent Literature 1, a magnetic stripe is formed in a direction perpendicular to a conveying direction of the magnetic medium. The magnetic stripe reading/writing device includes a slide mechanism, which moves the magnetic head in a direction where the magnetic stripe is formed, and conveying rollers for conveying the magnetic medium in a direction perpendicular to the moving direction of the magnetic head.

Further, conventionally, a card reader has been known which performs reading of magnetic data recorded on a card and writing of magnetic data to a card (for example, see Patent Literature 2). The card reader described in Patent Literature 2 includes a card processing part having a card conveying mechanism and a magnetic head, and a card insertion part which is formed with an insertion port for a card. A card conveying passage where a card is conveyed is formed on a rear side relative to the insertion port. The card insertion part includes a card insertion detection mechanism for detecting whether a card has been inserted into the insertion port or not and a shutter member for opening or closing the card conveying passage. The shutter member is capable of closing the card conveying passage over the entire region of the card conveying passage in a widthwise direction of the card conveying passage. Further, the card insertion part includes a pre-head (magnetic head) for detecting whether magnetic data are recorded on a card or not and a metal sensor for detecting whether an IC chip is built in the card or not.

In the card reader described in Patent Literature 2, a card insertion detection mechanism, a pre-head and a metal sensor are disposed between the insertion port and the shutter member in a conveying direction of a card. In the card reader, the shutter member has closed the card conveying passage in a standby state before a card is inserted. Further, in the card reader, when it is detected that a normal card has been inserted into the insertion port based on detected results of the card inserting detection mechanism, the pre-head and the metal sensor, the shutter member opens the card conveying passage.

A shape of a card having a magnetic stripe is specified in the international standard and JIS standard and is formed in a substantially rectangular shape whose four corners are rounded. Further, the magnetic stripe is formed in a strip shape which is parallel to a longitudinal direction of the card formed in a substantially rectangular shape. A card with a magnetic stripe in conformity with the international standard or JIS standard is processed in the card reader described in Patent Literature 2 and the card is conveyed in its longitudinal direction.

In the card reader described in Patent Literature 2, for example, when a card is forcibly inserted into an insertion port at an unexpected speed, even if a normal card is inserted into the insertion port, there may be a case that the shutter member does not open the card conveying passage because the card insertion detection mechanism, the pre-head and the metal sensor do not detect appropriately. In this case, a rear end of the card inserted from the insertion port is abutted with the shutter member and thus, in this state, if a user cannot hold a front end side of the card abutted with the shutter member, it is required that the system on which the card reader is mounted is stopped for performing taking-out processing of the card. In order to prevent such a problem, in the card reader described in Patent Literature 2, a distance between the insertion port and the shutter member in the conveying direction of a card is set so that a front end side of the card whose rear end is abutted with the shutter member is protruded from the insertion port so as to be capable of being held by a user.

PATENT LITERATURE

[PTL 1] Japanese Patent Laid-Open No. Hei 9-128872
[PTL 2] Japanese Patent Laid-Open No. 2010-160666

In a device where a magnetic medium is conveyed in a direction perpendicular to a direction of a magnetic stripe like a magnetic stripe reading/writing device described in Patent Literature 1, when a card with a magnetic stripe in conformity with the international standard or JIS standard is processed, the card is conveyed in its short widthwise direction. Even in the device where a card is conveyed in its short widthwise direction, it is preferable that a shutter member for closing the entire region in a widthwise direction of a card conveying passage is disposed in a card insertion part for preventing a card other than a normal card from being taken into the device and for preventing mischief and the like. Further, also in this device, it is preferable that a card insertion detection mechanism for detecting a normal card which has been inserted into an insertion port is disposed between the insertion port and the shutter member. In addition, also in this device, it is preferable that a distance between the insertion port and the shutter member in the conveying direction of a card is set so that a front end side of the card whose rear end is abutted with the shutter member is protruded from the insertion port so as to be capable of being held by a user.

However, in a device where a card is conveyed in its short widthwise direction, when a distance between the insertion port and the shutter member in the conveying direction of a card is set so that a front end side of the card whose rear end is abutted with the shutter member is protruded from the insertion port so as to be capable of being held by a user, the distance between the insertion port and the shutter member becomes short in the conveying direction of a card. Therefore, it is difficult that a card insertion detection mechanism and the like are disposed between the insertion port and the shutter member. Further, in a device where a card is conveyed in its short widthwise direction, unless a conveying roller for conveying a card is disposed at a nearer position to an insertion port in comparison with a device where a card is conveyed in its longitudinal direction, a card inserted into the insertion port is unable to be taken into the inside and ejected from the insertion port. Therefore, there may be a case that a conveying roller is disposed between the insertion port and the shutter member. However, when a distance between the insertion port and the shutter member is shortened in the conveying direction of a card, it is difficult that a conveying roller is disposed between the insertion port and the shutter member.

Further, in a device where a card is conveyed for processing in its longitudinal direction, a width of the insertion port for a card is formed depending on a width of a short widthwise direction of the card. Therefore, in this device, no card is inserted into the insertion port so that a short widthwise direction of a card is coincided with the conveying direction of a card (in other words, so that a longitudinal direction of a card is coincided with a widthwise direction of the insertion port).

On the other hand, in a device where a card is conveyed for processing in its short widthwise direction, a width of the insertion port is formed depending on a width in a longitudinal direction of a card. Therefore, in this device, a card may be inserted into the insertion port so that a longitudinal direction of the card is coincided with the conveying direction of the card (in other words, so that a short widthwise direction of a card is coincided with the widthwise direction of the insertion port). However, in a device where a card is conveyed in its short widthwise direction for processing, even when a card inserted into the insertion port so that a longitudinal direction of a card is coincided with the conveying direction of the card is taken into an inside of the device, predetermined processing is unable to be performed on the card. Therefore, in a device where a card is conveyed in its short widthwise direction for processing, it is required to detect whether a card has been inserted into the insertion port so that a short widthwise direction of a card is coincided with the conveying direction of the card or a card has been inserted into the insertion port so that a longitudinal direction of a card is coincided with the conveying direction of the card for performing appropriate processing.

Further, in a device where a card is conveyed in its short widthwise direction, unless a conveying roller for conveying a card is disposed at a nearer position to the insertion port in comparison with a device where a card is conveyed in its longitudinal direction, a card inserted into the insertion port is unable to be taken into the inside and ejected from the insertion port. Therefore, there may be a case that a conveying roller is required to dispose between the insertion port and the shutter member but, when a conveying roller is disposed between the insertion port and the shutter member, a distance between the insertion port and the shutter member becomes longer. When a distance between the insertion port and the shutter member becomes long, dust, water and the like entered through the insertion port may be accumulated in the card insertion part to cause a problem for processing of a card having been inserted through the insertion port.

SUMMARY

In view of the problem described above, at least an embodiment of the present invention provides a card reader for use with a card formed in a substantially rectangular shape which is conveyed in a short widthwise direction of the card and is processed, in which, while securing a distance in a conveying direction of the card between an insertion port into which a card is inserted and the shutter member for closing the conveying passage for a card, an end part of a card is capable of being held by a user even when the card is forcibly inserted in a state that a shutter member closes the conveying passage.

At least an embodiment of the present invention also provides a card reader for use with a card formed in a substantially rectangular shape which is conveyed in a short widthwise direction of the card and is processed, which is capable of detecting whether a card has been inserted into the insertion port so that a short widthwise direction of the card is coincided with the conveying direction of the card or the card has been inserted into the insertion port so that a longitudinal direction of the card is coincided with the conveying direction of the card.

At least an embodiment of the present invention also provides a card reader for use with a card formed in a substantially rectangular shape which is conveyed in a short widthwise direction of the card and is processed, which is capable of restraining dust, water and the like from being accumulated in an inside of the card insertion part which is formed with an insertion port for a card.

To achieve the above, at least an embodiment of the present invention provides a card reader for use with a card formed in a substantially rectangular shape which is conveyed in a short widthwise direction of the card and is processed, including a card insertion part which is formed with an insertion port for the card, and a conveying passage for the card which is connected with the insertion port. The card insertion part includes a shutter member which is disposed on a rear side with respect to the insertion port in a taking-in direction of the card and is movable between a closed position where the conveying passage is closed and an open position where the conveying passage is opened, and a protruding member which is attached to the shutter member and is protruded from the shutter member to the insertion port side. The insertion port side of the protruding member is formed with a card abutting face which is capable of abutting with the card, and a distance between the insertion port and the card abutting face in a conveying direction of the card is set to be shorter than a width in the short widthwise direction of the card.

In the card reader in accordance with at least an embodiment of the present invention, a protruding member protruded from the shutter member to the insertion port side is attached to the shutter member and a card abutting face with which a card is abutted is formed on the insertion port side of the protruding member. Further, in at least an embodiment of the present invention, a distance between the insertion port and the card abutting face in the conveying direction of a card is shorter than a width of a card in its short widthwise direction. Therefore, according to at least an embodiment of the present invention, even in a case that a distance between the insertion port and the shutter member in the conveying direction of a card is set to be longer, when a card is forcibly inserted into the insertion port in a state that the shutter member closes the conveying passage, the card is abutted with the card abutting face and is protruded from the insertion port and thus a user is capable of holding an end part of the card which is abutted with the card abutting face. Accordingly, in at least an embodiment of the present invention, while a distance between the insertion port and the shutter member in the conveying direction of a card is secured, a user is capable of holding an end part of the card even when the card is forcibly inserted in a state that the shutter member closes the conveying passage.

In at least an embodiment of the present invention, it is preferable that the shutter member located at the closed position closes the conveying passage over the entire region of the conveying passage in a widthwise direction of the conveying passage which is perpendicular to the conveying direction of the card. According to this structure, mischief to the card reader can be prevented effectively. On the other hand, when the shutter member is structured so as to close the conveying passage over the entire region of the conveying passage in a widthwise direction of the conveying passage, a space occupied by the shutter member becomes large. In order to prevent the problem, when a distance between the insertion port and the shutter member in the conveying direction of a card is set to be shortened, it is difficult to dispose an insertion detection mechanism for detecting insertion of a card, or the like between the insertion port and the shutter member. However, according to at least an embodiment of the present invention, a distance in the conveying direction of a card between the insertion port and the shutter member can be secured and thus, even when the shutter member is structured so as to close the conveying passage over the entire region of the conveying passage in the widthwise direction of the conveying passage, the insertion detection mechanism or the like can be easily disposed between the insertion port and the shutter member.

In at least an embodiment of the present invention, it is preferable that a plurality of the protruding members are disposed in a separated state with a predetermined distance therebetween in a widthwise direction of the conveying passage which is perpendicular to the conveying direction of the card. According to this structure, a card which is forcibly inserted into the insertion port in a state that the shutter member closes the conveying passage can be abutted with a plurality of the card abutting faces. Therefore, a state of the card which is abutted with the card abutting face can be stabilized.

In at least an embodiment of the present invention, it is preferable that the card insertion part includes a first insertion detection mechanism which is disposed on the insertion port side relative to the shutter member and detects the card inserted into the insertion port so that a short widthwise direction of the card is coincided with the conveying direction of the card by detecting both ends of the card in a widthwise direction of the conveying passage which is perpendicular to the conveying direction of the card, and a second insertion detection mechanism which is disposed on the insertion port side relative to the shutter member and detects the card inserted into the insertion port by contacting with a front face and/or a rear face of the card. According to this structure, in a case that a card has been inserted into the insertion port so that a short widthwise direction of the card and the conveying direction of the card are coincided with each other, the card can be detected by the first insertion detection mechanism and the second insertion detection mechanism. Further, according to this structure, in a case that a card has been inserted into the insertion port so that a longitudinal direction of the card and the conveying direction of the card are coincided with each other, a card can be detected by the second insertion detection mechanism but the card is not detected by the first insertion detection mechanism. Therefore, based on a detected result of the first insertion detection mechanism and a detected result of the second insertion detection mechanism, it can be detected whether a card has been inserted so that a short widthwise direction of the card and the conveying direction of the card are coincided with each other, or the card has been inserted so that a longitudinal direction of the card and the conveying direction of the card are coincided with each other. Further, the shutter member is moved to an open position in a case that a card has been inserted into the insertion port so that a short widthwise direction of the card and the conveying direction of the card are coincided with each other and, in a case that a card has been inserted into the insertion port so that a longitudinal direction of the card and the conveying direction of the card are coincided with each other, the shutter member is remained at a closed position. On the other hand, when a distance between the insertion port and the shutter member in the conveying direction of a card is set to be shortened, it is difficult that the first insertion detection mechanism and the second insertion detection mechanism are disposed on the insertion port side relative to the shutter member. However, according to at least an embodiment of the present invention, a distance between the insertion port and the shutter member in the conveying direction of a card can be easily secured and thus, the first insertion detection mechanism and the second insertion detection mechanism can be easily disposed on the insertion port side relative to the shutter member.

In at least an embodiment of the present invention, it is preferable that the card insertion part includes a magnetic detection mechanism which is disposed on the insertion port side relative to the shutter member and detects that magnetic data are recorded on the card, and a metal detection mechanism which is disposed on the insertion port side relative to the shutter member and detects an external connection terminal of an IC chip which is fixed to the card. According to this structure, based on a detected result by the magnetic detection mechanism and a detected result by the metal detection mechanism, it can be appropriately judged whether a card inserted into the insertion port is a normal card which should be taken into the card reader or another card which should not be taken into the card reader. Further, based on a detected result of the magnetic detection mechanism and a detected result of the metal detection mechanism, it can be judged whether a front face or a rear face of a card inserted into the insertion port faces upward, and from which side in the short widthwise direction of the card has been inserted into the insertion port. Further, based on these judgment results, in a case that the card should be taken into the card reader, the shutter member can be moved to an open position and, in a case that the card should not be taken into the card reader, the shutter member can be remained at a closed position. On the other hand, when a distance between the insertion port and the shutter member in the conveying direction of a card is short, it is difficult that the magnetic detection mechanism and the metal detection mechanism are disposed on the insertion port side relative to the shutter member. However, according to at least an embodiment of the present invention, a distance between the insertion port and the shutter member in the conveying direction of a card can be secured and thus, the magnetic detection mechanism and the metal detection mechanism can be easily disposed on the insertion port side relative to the shutter member.

In at least an embodiment of the present invention, it is preferable that the card reader includes a card conveying mechanism structured to convey the card and the card conveying mechanism includes a conveying roller which is disposed on the insertion port side relative to the shutter member. According to this structure, even when a card is conveyed in a short widthwise direction of the card, the card inserted into the insertion port can be taken into an inside of the card reader and the card can be appropriately ejected from the insertion port by using the conveying roller disposed on a front side relative to the shutter member. On the other hand, when a distance between the insertion port and the shutter member in the conveying direction of a card is short, it is difficult that the conveying roller is disposed on the insertion port side relative to the shutter member. However, according to at least an embodiment of the present invention, a distance between the insertion port and the shutter member in the conveying direction of a card can be secured and thus, the conveying roller is easily disposed on the insertion port side relative to the shutter member.

To achieve the above, at least an embodiment of the present invention provides a card reader for use with a card formed in a substantially rectangular shape which is conveyed in a short widthwise direction of the card and is processed, including a card insertion part which is formed with an insertion port for the card, and a conveying passage for the card which is connected with the insertion port. The card insertion part includes an insertion detection mechanism which detects the card inserted into the insertion port so that a short widthwise direction of the card is coincided with a conveying direction of the card by detecting both ends of the card in a widthwise direction of the conveying passage which is perpendicular to the conveying direction of the card, a card contact member which is capable of protruding to and retreating from the conveying passage and is capable of contacting with a front face or a rear face of the card, and a contact member sensor which detects a protruding-retreating state of the card contact member for the conveying passage. The card contact member is disposed at a position where, in a case that the card has been inserted into the insertion port so that a longitudinal direction of the card is coincided with the conveying direction of the card, the card contact member is contacted with the card having been inserted even when the card has been inserted at any position in the widthwise direction of the conveying passage.

Further, to above, at least an embodiment of the present invention provides a card reader for use with a card formed in a substantially rectangular shape which is conveyed in a short widthwise direction of the card and is processed, including a card insertion part which is formed with an insertion port for the card, and a conveying passage for the card which is connected with the insertion port. The card insertion part includes an insertion detection mechanism which detects the card inserted into the insertion port so that a short widthwise direction of the card is coincided with a conveying direction of the card by detecting both ends of the card in a widthwise direction of the conveying passage which is perpendicular to the conveying direction of the card, a card contact member which is capable of protruding to and retreating from the conveying passage and is capable of contacting with a front face or a rear face of the card, and a contact member sensor which detects a protruding-retreating state of the card contact member to and from the conveying passage. A width of the card contact member in the widthwise direction of the conveying passage is set so that, in a case that the card has been inserted into the insertion port so that a longitudinal direction of the card is coincided with the conveying direction of the card, the card having been inserted is contacted with the card contact member even when the card has been inserted at any position in the widthwise direction of the conveying passage.

In the card reader in accordance with at least an embodiment of the present invention, the card insertion part includes a card contact member which is capable of protruding to and retreating from the conveying passage and is capable of contacting with a front face or a rear face of the card, and a contact member sensor which detects a protruding-retreating state of the card contact member to and from the conveying passage. Further, in at least an embodiment of the present invention, in a case that the card has been inserted into the insertion port so that a longitudinal direction of the card is coincided with the conveying direction of the card, the card contact member is disposed at a position where the inserted card is contacted with the card contact member even when the card has been inserted at any position in the widthwise direction of the conveying passage. Alternatively, in at least an embodiment of the present invention, a width of the card contact member in the widthwise direction of the conveying passage is set so that, in a case that the card has been inserted into the insertion port so that a longitudinal direction of the card is coincided with the conveying direction of the card, the inserted card is contacted with the card contact member even when the card has been inserted at any position in the widthwise direction of the conveying passage.

Therefore, according to at least an embodiment of the present invention, in addition to a case that a card is inserted into the insertion port so that a short widthwise direction of the card is coincided with the conveying direction of the card, even in a case that a card is inserted into the insertion port so that a longitudinal direction of the card is coincided with the conveying direction of the card, the card is contacted with the card contact member. Accordingly, in at least an embodiment of the present invention, when a card is contacted with the card contact member, the contact member sensor detects movement of the card contact member with respect to the conveying passage. As a result, in addition to a case that a card is inserted into the insertion port so that a short widthwise direction of the card is coincided with the conveying direction of the card, even in a case that a card is inserted into the insertion port so that a longitudinal direction of the card is coincided with the conveying direction of the card, a card inserted into the insertion port can be detected by the contact member sensor.

Further, in at least an embodiment of the present invention, the card insertion part includes an insertion detection mechanism which detects the card inserted into the insertion port so that a short widthwise direction of the card is coincided with a conveying direction of the card by detecting both ends of the card in a widthwise direction of the conveying passage which is perpendicular to the conveying direction of the card. Therefore, according to at least an embodiment of the present invention, based on a detected result of the insertion detection mechanism, it can be detected that a card has been inserted into the insertion port so that a short widthwise direction of the card is coincided with a conveying direction of the card. Further, in at least an embodiment of the present invention, in a case that the insertion detection mechanism does not detect a card inserted into the insertion port so that a short widthwise direction of the card and the conveying direction of the card are coincided with each other, but the contact member sensor detects that a card has been inserted into the insertion port, it can be detected that a card has been inserted into the insertion port so that a longitudinal direction of the card is coincided with the conveying direction of the card based on a detected result of the insertion detection mechanism and a detected result of the contact member sensor. Therefore, according to at least an embodiment of the present invention, based on a detected result of the insertion detection mechanism and a detected result of the contact member sensor, it can be detected whether a card has been inserted into the insertion port so that a short widthwise direction of the card and the conveying direction of the card are coincided with each other, or a card has been inserted into the insertion port so that a longitudinal direction of the card is coincided with the conveying direction of the card.

In at least an embodiment of the present invention, it is preferable that the card insertion part includes a magnetic sensor which detects magnetic data recorded on the card. In this case, for example, the card insertion part includes the magnetic sensor which is disposed at least one side with respect to the conveying passage in a thickness direction of the card which is perpendicular to the conveying direction of the card and the widthwise direction of the conveying passage. According to this structure, based on a detected result of the magnetic sensor, it can be determined whether a normal card on which magnetic data are recorded has been inserted into the insertion port, or a card other than a normal card on which magnetic data are not recorded has been inserted into the insertion port.

In at least an embodiment of the present invention, it is preferable that the card insertion part includes the two magnetic sensors which are disposed in the thickness direction of the card so as to interpose the card. According to this structure, it can be detected on which face of a card inserted into the insertion port is recorded with magnetic data. Therefore, it can be detected whether a card has been inserted into the insertion port in a state that a front face and a rear face of the card face in a correct attitude.

In at least an embodiment of the present invention, it is preferable that the card is defined with an embossing area where embossing is performed, and the two magnetic sensors are disposed at positions avoiding the embossing area in the widthwise direction of the conveying passage. In a case that the magnetic sensors are disposed at positions overlapping with an embossing area in a thickness direction of a card, distances in the thickness direction of the card between the card passing through the conveying passage and the magnetic sensors are required to increase for preventing characters, digits and the like, which are protruded from a front face of the card by embossing, from contacting with the magnetic sensors. Therefore, detection accuracy of magnetic data by the magnetic sensors may be lowered. On the other hand, when the two magnetic sensors are disposed at positions avoiding the embossing area in the widthwise direction of the conveying passage, the distances in the thickness direction of the card between the card passing through the conveying passage and the magnetic sensors can be made smaller and, as a result, detection accuracy of magnetic data by the magnetic sensors can be enhanced.

In at least an embodiment of the present invention, it is preferable that the card insertion part includes a metal sensor which detects an external connection terminal of an IC chip fixed to the card. According to this structure, based on a detected result of the metal sensor, it can be determined whether a normal card to which an external connection terminal is fixed has been inserted into the insertion port, or a card other than a normal card to which no external connection terminal is fixed has been inserted into the insertion port. Further, according to this structure, in a case that the card insertion part includes the two magnetic sensors which are disposed in the thickness direction of the card perpendicular to the conveying direction of the card and the widthwise direction of the conveying passage so as to interpose the card, based on a detected result of the magnetic sensor and a detected result of the metal sensor, it can be detected whether a card has been inserted from one end side in its short widthwise direction, or a card has been inserted from the other end side in its short widthwise direction.

In at least an embodiment of the present invention, for example, the insertion detection mechanism includes a second card contact member which is capable of protruding to and retreating from the conveying passage and is capable of contacting with an end part of the card in the widthwise direction of the conveying passage, and a second contact member sensor which detects a protruding-retreating state of the second card contact member to and from the conveying passage. The card contact member and the second card contact member are disposed at substantially the same position as each other in the card conveying direction. In this case, a detected result of the contact member sensor and a detected result of the second contact member sensor can be obtained approximately simultaneously.

To achieve the above, at least an embodiment of the present invention provides a card reader for use with a card formed in a substantially rectangular shape which is conveyed in a short widthwise direction of the card and is processed, including a card insertion part which is formed with an insertion port for the card, and a conveying passage for the card which is connected with the insertion port. The card insertion part includes a first shutter member which is disposed on a rear side with respect to the insertion port in a taking-in direction of the card and is movable between a first closed position where the conveying passage is closed and a first open position where the conveying passage is opened, a shutter drive mechanism structured to drive the first shutter member between the first closed position and the first open position, a second shutter member which is disposed on an insertion port side relative to the first shutter member and is movable between a second closed position where the conveying passage is closed and a second open position where the conveying passage is opened, and an urging member which urges the second shutter member toward the second closed position. The second shutter member is moved to the second open position when the card inserted into the insertion port is contacted.

In the card reader in accordance with at least an embodiment of the present invention, a first shutter member which is movable between a first closed position where the conveying passage is closed and a first open position where the conveying passage is opened is disposed on a rear side relative to the insertion port, and a shutter drive mechanism is connected with the first shutter member. Therefore, in at least an embodiment of the present invention, in a case that a normal card has been inserted into the insertion port in a correct attitude, the first shutter member can be driven by the shutter drive mechanism and the first shutter member is moved to a first open position. Accordingly, in at least an embodiment of the present invention, a card other than a normal card and a card inserted in an incorrect attitude are prevented from being taken into an inside of the card reader or mischief and the like can be prevented.

Further, in at least an embodiment of the present invention, a second shutter member which is movable between a second closed position where the conveying passage is closed and a second open position where the conveying passage is opened is disposed on an insertion port side relative to the first shutter member. The second shutter member is urged toward the second closed position by an urging member and, when a card inserted into the insertion port is contacted, the second shutter member is moved to the second open position. In other words, the second shutter member always closes the conveying passage by an urging force of the urging member when a card is not inserted.

Therefore, according to at least an embodiment of the present invention, even when a distance between the first shutter member and the insertion port is long, dust, water and the like are restrained from entering into an inside of the card insertion part by the second shutter member which is disposed on the insertion port side relative to the first shutter member. Accordingly, in at least an embodiment of the present invention, dust, water and the like can be restrained from being accumulated in the inside of the card insertion part. Further, in at least an embodiment of the present invention, the second shutter member is urged toward the second closed position by an urging member and, when a card inserted into the insertion port is contacted, the second shutter member is moved to the second open position. Therefore, no drive mechanism for driving the second shutter member is required. Accordingly, in at least an embodiment of the present invention, a structure of the card reader can be simplified.

In at least an embodiment of the present invention, it is preferable that the second shutter member is a roller which is rotatable with a widthwise direction of the conveying passage perpendicular to the conveying direction of the card as an axial direction of rotation. According to this structure, when the second shutter member and a card are contacted with each other, the roller which is the second shutter member can be rotated. Therefore, conveyance resistance of a card can be reduced when the second shutter member and the card are contacted with each other.

In at least an embodiment of the present invention, for example, the card insertion part includes an abutting member with which the second shutter member located at the second closed position is abutted, and the abutting member is disposed on one side with respect to the conveying passage in a thickness direction of the card which is perpendicular to the conveying direction of the card and a widthwise direction of the conveying passage perpendicular to the conveying direction of the card, and the second shutter member is retreated to the other side with respect to the conveying passage in the thickness direction of the card at the second open position and is urged toward the abutting member by the urging member. In this case, in comparison with a case that the second shutter member is disposed on both sides with respect to the conveying passage in a thickness direction of a card, a structure of the card reader can be simplified.

In at least an embodiment of the present invention, it is preferable that the abutting member is disposed on an upper side with respect to the conveying passage, and the second shutter member is retreated to a lower side with respect to the conveying passage at the second open position, and an opening part communicating with an outside of the card reader is formed on a lower side of the card insertion part with respect to the second shutter member. According to this structure, dust, water and the like prevented from entering to the inside of the card insertion part by the second shutter member can be discharged through the opening part to the outside of the card insertion part. Therefore, dust, water and the like can be restrained from being accumulated in the inside of the card insertion part.

In at least an embodiment of the present invention, it is preferable that the card insertion part includes a shutter member sensor which detects the second shutter member moved to the second open position. According to this structure, it can be detected that a card has been inserted into the insertion port by using the second shutter member and the shutter member sensor.

In at least an embodiment of the present invention, it is preferable that the second shutter member is disposed at a position where, in a case that the card has been inserted into the insertion port so that a longitudinal direction of the card is coincided with the conveying direction of the card, the inserted card is contacted with the second shutter member even when the card has been inserted at any position in a widthwise direction of the conveying passage perpendicular to the conveying direction of the card. Further, in at least an embodiment of the present invention, it is preferable that a width of the second shutter member in the widthwise direction of the conveying passage perpendicular to the conveying direction of the card is set so that, in a case that the card has been inserted into the insertion port so that a longitudinal direction of the card is coincided with the conveying direction of the card, the inserted card is contacted with the second shutter member even when the card has been inserted at any position in the widthwise direction of the conveying passage. According to this structure, in addition to a case that a card is inserted into the insertion port so that a short widthwise direction of the card is coincided with the conveying direction of the card, even in a case that a card is inserted into the insertion port so that a longitudinal direction of the card is coincided with the conveying direction of the card, it can be detected that a card has been inserted into the insertion port by using the second shutter member and the shutter member sensor.

In at least an embodiment of the present invention, for example, the shutter drive mechanism drives the first shutter member based on a detected result of the shutter member sensor.

In at least an embodiment of the present invention, it is preferable that the card insertion part includes a protruding member which is attached to the first shutter member and is protruded from the first shutter member to an insertion port side, and an insertion port side of the protruding member is formed with a card abutting face which is capable of abutting with the card, and a distance between the insertion port and the card abutting face in the conveying direction of the card is set to be shorter than a width in the short widthwise direction of the card. According to this structure, even in a case that a distance between the first shutter member and the insertion port is set to be long, for example, when a card is forcibly inserted at an unexpected speed in a state that the conveying passage is closed by the first shutter member, the card can be abutted with the card abutting face and the card can be protruded from the insertion port so that an end part of the card abutted with the card abutting face is capable of being held by a user. Therefore, while securing a distance between the insertion port and the shutter member in the conveying direction of a card, a user is capable of holding an end part of a card even when the card is forcibly inserted in a state that the shutter member closes the conveying passage.

As described above, according to at least an embodiment of the present invention, in a card reader for use with a card formed in a substantially rectangular shape which is conveyed in a short widthwise direction of the card and is processed, while securing a distance between the insertion port and the shutter member in the conveying direction of a card, a user is capable of holding an end part of a card even when the card is forcibly inserted in a state that the shutter member closes the conveying passage.

Further, in at least an embodiment of the present invention, in a card reader for use with a card formed in a substantially rectangular shape which is conveyed in a short widthwise direction of the card and is processed, it can be detected whether a card has been inserted into the insertion port so that a short widthwise direction of the card and the conveying direction of the card are coincided with each other, or a card has been inserted into the insertion port so that a longitudinal direction of the card is coincided with the conveying direction of the card.

Further, in at least an embodiment of the present invention, in a card reader for use with a card formed in a substantially rectangular shape which is conveyed in a short widthwise direction of the card and is processed, dust, water and the like can be restrained from being accumulated in the inside of the card insertion part.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is a front view for explaining the structure of the head moving mechanism shown in FIG. 2.

FIGS. 6(A) and 6(B) are front views for explaining a contact block moving mechanism which drives an IC contact block shown in FIG. 2.

FIG. 7 is a side view for explaining a state that a shutter member shown in FIG. 2 closes a conveying passage.

FIG. 8 is a side view for explaining a state that the shutter member shown in FIG. 7 opens a conveying passage.

FIG. 9 is a front view for explaining a shutter drive mechanism which drives the shutter member shown in FIG. 2.

FIG. 10 is a side view for explaining a structure on a front end side of a card insertion part shown in FIG. 2.

FIG. 13 is a front view for explaining a positional relationship in an upper and lower direction between magnetic sensors shown in FIGS. 12(A) and 12(B) and a card inserted through an insertion port.

DESCRIPTION OF EMBODIMENTS

Embodiments of the present invention will be described below with reference to the accompanying drawings.

Entire Structure of Card Reader

Figure 1:
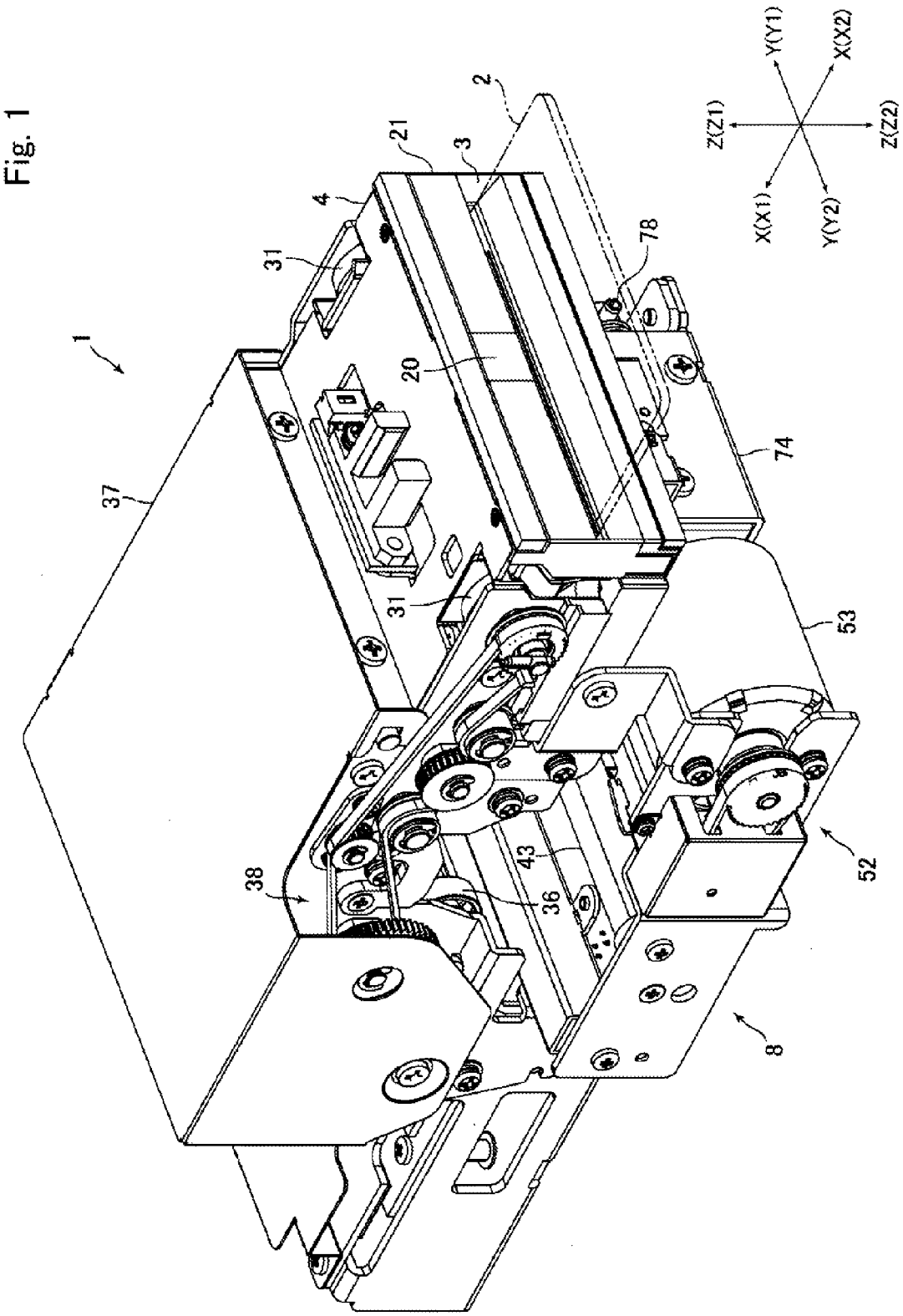
FIG. 1 is a perspective view showing a card reader in accordance with an embodiment of the present invention.
Figure 2:
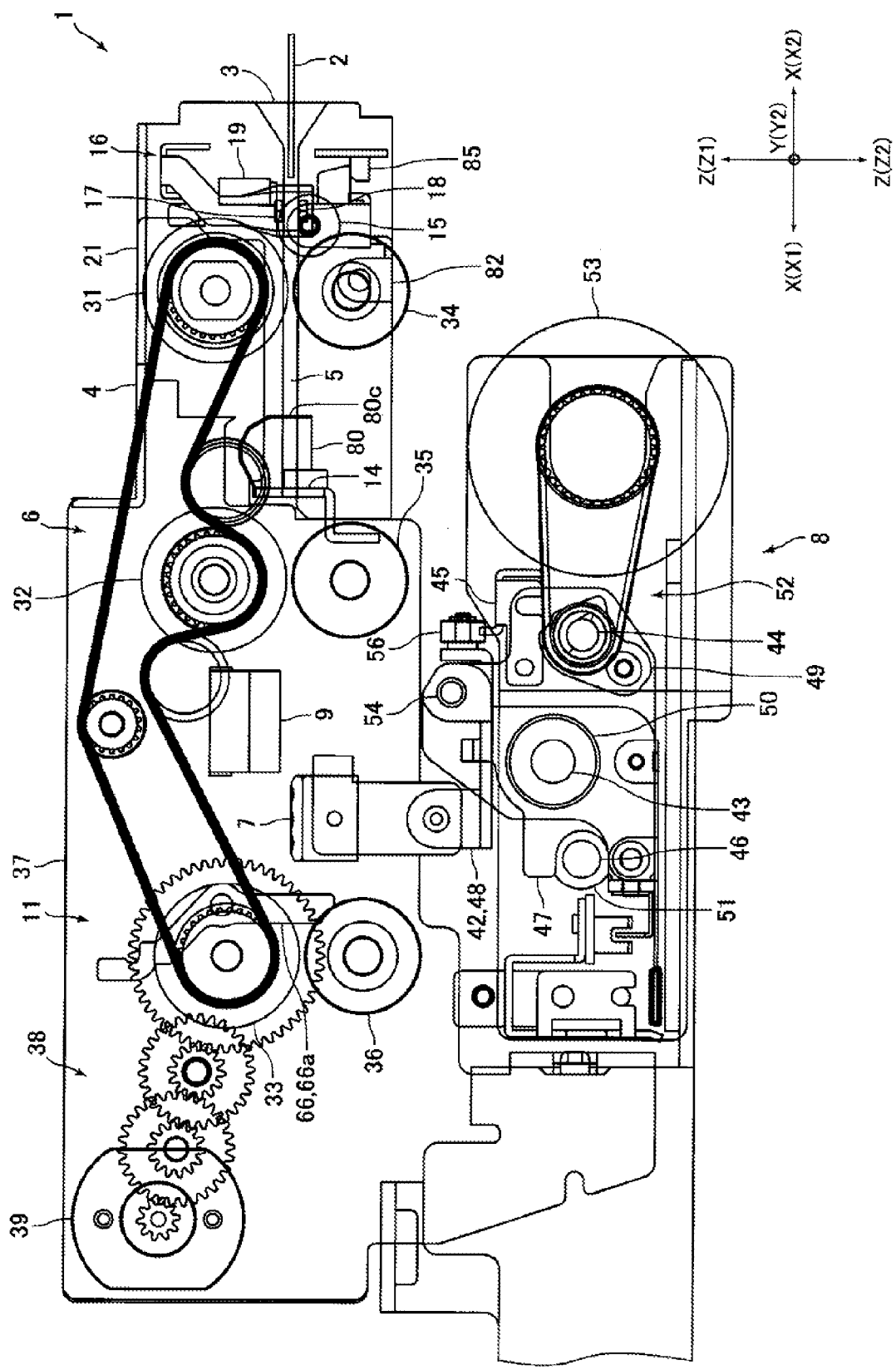
FIG. 2 is a side view for explaining a schematic structure of the card reader shown in FIG. 1.
Figure 3:
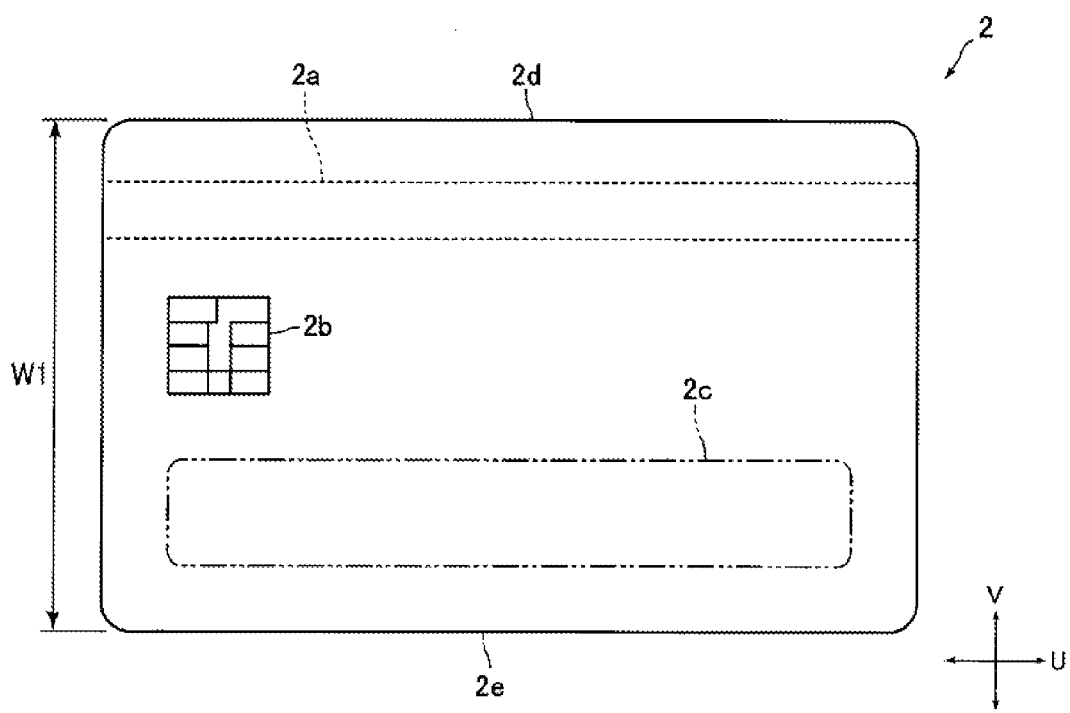
FIG. 3 is a plan view showing a card in FIG. 1.
Figure 4:
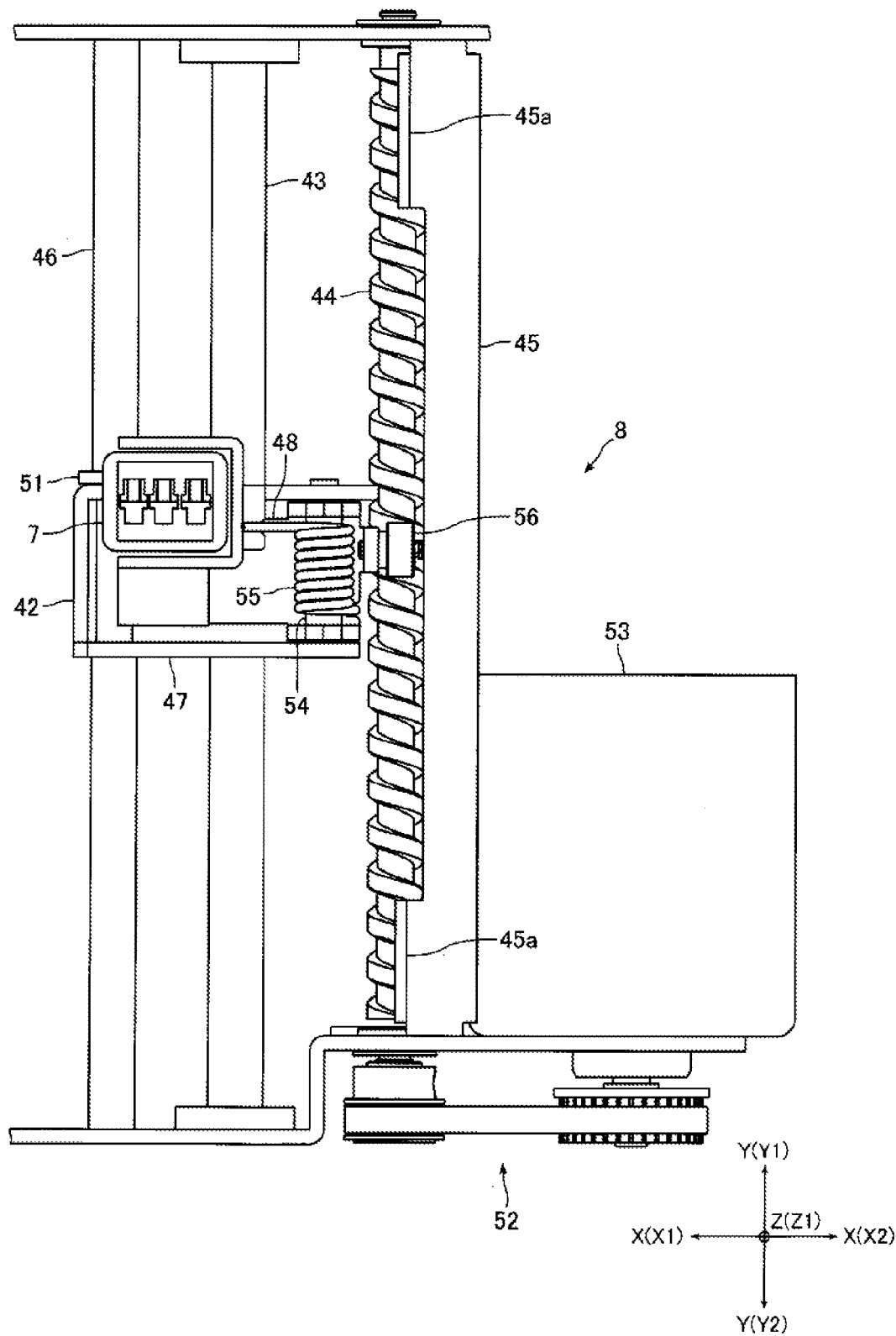
FIG. 4 is a top plan view for explaining a structure of a head moving mechanism shown in FIG. 2.

FIG. 1 is a perspective view showing a card reader 1 in accordance with an embodiment of the present invention. FIG. 2 is a side view for explaining a schematic structure of the card reader 1 shown in FIG. 1. FIG. 3 is a plan view showing a card 2 in FIG. 1. FIG. 4 is a top plan view for explaining a structure of a head moving mechanism 8 shown in FIG. 2. FIG. 5 is a front view for explaining the structure of the head moving mechanism 8 shown in FIG. 2. FIGS. 6(A) and 6(B) are front views for explaining a contact block moving mechanism 10 which drives an IC contact block 9 shown in FIG. 2.

The card reader 1 in this embodiment is a device for performing at least one of reading of magnetic data recorded on a card 2 and recording of magnetic data to a card 2 and is mounted on and used in a predetermined host device such as an ATM (Automated Teller Machine). The card reader 1 includes a card insertion part 4, which is formed with an insertion port 3 into which a card 2 is inserted. As shown in FIG. 2, a conveying passage 5 for a card which is connected with the insertion port 3 is formed in an inside of the card reader 1.

Further, the card reader 1 includes a card conveying mechanism 6 for conveying a card 2, a magnetic head 7 which is structured to abut with the card 2 and to perform reading of magnetic data recorded on the card 2 and recording of magnetic data to the card 2, a head moving mechanism 8 which is structured to move the magnetic head 7 in a direction perpendicular to a conveying direction of the card 2, an IC contact block 9 which is structured to contact with a terminal part 2b described below formed on the card 2 for exchanging data, a contact block moving mechanism 10 for moving the IC contact block 9, and a positioning mechanism 11 for positioning the card 2 which is taken into the card reader 1.

A card 2 is a card which is made of vinyl chloride whose thickness is about 0.7-0.8 mm. A card 2 in this embodiment is a card with a magnetic stripe in conformity with the international standard (for example, ISO/IEC 7811) or JIS standard (for example, JISX 6302) and is formed in a substantially rectangular shape whose four corners are rounded. A rear face of a card 2 is formed with a magnetic stripe 2a in which magnetic data are recorded. Further, the card 2 is a contact type IC card. In other words, the card 2 has a built-in IC chip (not shown) and a front face of the card 2 is formed with a terminal part 2b comprised of eight external connection terminals. A part of the card 2 is formed with an embossing area 2c where embossing is performed. In other words, the card 2 is defined with an embossing area 2c where embossing is performed.

The magnetic stripe 2a is formed in a long and thin strip shape which is parallel to a longitudinal direction ("U" direction in FIG. 3) of the card 2 formed in a substantially rectangular shape. The magnetic stripe 2a is formed over the entire region in the longitudinal direction of the card 2. Further, the magnetic stripe 2a is formed on one end 2d side in the short widthwise direction ("V" direction in FIG. 3) of the card 2. Specifically, the magnetic stripe 2a is formed within a predetermined region with the one end 2d of the card 2 in the short widthwise direction of the card 2 as a reference based on the international standard or JIS standard.

The terminal part 2b is formed on one end side in the longitudinal direction of the card 2 and at a roughly center position in the short widthwise direction of the card 2. Eight external connection terminals which structure the terminal part 2b are arranged in four lines in the short widthwise direction of the card 2 and in two rows in the longitudinal direction of the card 2. The embossing area 2c is disposed on the other end 2e side in the short widthwise direction of the card 2. Further, the embossing area 2c is formed in a predetermined area except both end sides in the longitudinal direction of the card 2. Characters, digits or the like which are formed in an embossing area by embossing are protruded to a side of a front face of a card.

In this embodiment, a card 2 is conveyed in an "X" direction which is shown in FIG. 1 and the like. Specifically, a card 2 is taken in an "X1" direction and the card 2 is ejected in an "X2" direction. In other words, the "X" direction is a conveyance direction of a card 2, the "X1" direction is a taking-in direction of the card 2, and the "X2" direction is an ejecting direction of the card 2. Further, in this embodiment, a card 2 is taken into the card reader 1 so that the short widthwise direction of the card 2 is coincided with the "X" direction. Further, the card 2 is conveyed in the card reader 1 so that the short widthwise direction of the card 2 is coincided with the "X" direction. In other words, the card reader 1 conveys a card 2 in the short widthwise direction of the card 2 to perform predetermined processing.

Further, the "Y" direction which is perpendicular to the "X" direction is a widthwise direction of the conveying passage 5 and is a longitudinal direction of a card 2 which is taken into the card reader 1 in a correct attitude. Further, a "Z" direction in FIG. 1 and the like perpendicular to the "X" direction and the "Y" direction is a thickness direction of a card 2 taken into the card reader 1. In this embodiment, the card reader 1 is disposed so that the "Z" direction and the vertical direction are coincided with each other. In the following descriptions, the "X" direction is referred to as a "front and rear direction", the "Y" direction is referred to as a "right and left direction" and the "Z" direction is referred to as an "upper and lower direction". Further, the "X1" direction side is referred to as a "rear" (back) side, the "X2" direction side is referred to as a "front" side, the "Y1" direction side is a "right" side, the "Y2" direction side is a "left" side, the "Z1" direction side is an "upper" side, and the "Z2" direction side is a "lower" side.

The card insertion part 4 structures a front face side portion of the card reader 1. The card insertion part 4 includes a shutter member 14 as a first shutter member disposed on a rear side with respect to an insertion port 3, a shutter member 15 as a second shutter member disposed between the insertion port 3 and the shutter member 14 in the front and rear direction, an insertion detection mechanism 16 as a first insertion detection mechanism for detecting a card 2 having been inserted into the card reader 1 (in other words, a card 2 having been inserted into the insertion port 3) so that the short widthwise direction of the card 2 is coincided with the front and rear direction, magnetic sensors 17 and 18 as a magnetic detection mechanism for detecting that magnetic data are recorded in the card 2, a metal sensor 19 as a metal detection mechanism for detecting that external connection terminals of an IC chip are fixed to a card 2 (in other words, the terminal part 2b is fixed), and a human body detecting infrared sensor 20 for detecting a human motion ahead of the card reader 1, and a case body 21 which accommodates these structures. A specific structure of the card insertion part 4 will be described below.

The conveying passage 5 is formed in a substantially entire region of the card reader 1 in the front and rear direction. The card conveying mechanism 6 includes conveying rollers 31 through 33 structured to abut with an upper face of a card 2 for conveying the card 2, and pad rollers 34 through 36 which are oppositely disposed to the conveying rollers 31 through 33 from a lower side. The conveying roller 31 is disposed in an inside of the card insertion part 4. Specifically, the conveying roller 31 is disposed on the front side relative to the shutter member 14 which is disposed on the rear end side relative to the card insertion part 4 in the front and rear direction. The conveying rollers 32 and 33 are disposed in an inside of a main body part 37 of the card reader 1 which is disposed on a rear side with respect to the card insertion part 4. Specifically, the conveying roller 32 is disposed on a front side relative to the magnetic head 7 and an IC contact block 9 in the front and rear direction and is disposed on a rear side relative to the shutter member 14. Further, the conveying roller 33 is disposed on a rear side relative to an abutting part 66a of a positioning member 66 described below structuring a positioning mechanism 11. The conveying rollers 31 through 33 are respectively disposed on both end sides in the right and left direction of the conveying passage 5. The conveying rollers 31 through 33 are connected with a motor 39 through a power transmission mechanism 38 which is structured of a belt, pulleys, a gear train and the like.

The pad roller 34 is urged toward the conveying roller 31 and is capable of abutting with a card 2 from a lower side. The pad roller 35 is urged toward the conveying roller 32 and is capable of abutting with a card 2 from a lower side. The pad roller 36 is urged toward the conveying roller 33 and is capable of abutting with a card 2 from a lower side. As described above, the conveying rollers 31 through 33 are respectively disposed on the both end sides in the right and left direction of the conveying passage 5, and the conveying rollers 31 through 33 are abutted with an upper face of a card 2 on the both end sides in its longitudinal direction and pad rollers 34 through 36 are abutted with an under face of the card 2 on both end sides in its longitudinal direction. Specifically, the conveying rollers 31 through 33 and the pad rollers 34 through 36 are abutted with portions where the embossing area 2c is avoided on both end sides in the longitudinal direction of a card 2. In accordance with an embodiment of the present invention, it may be structured that the conveying rollers 31 through 33 are abutted with an under face of a card 2 and the pad rollers 34 through 36 are oppositely disposed to the conveying rollers 31 through 33 on an upper side.

The magnetic head 7 is disposed between the conveying roller 32 and the pad roller 35 and the conveying roller 33 and the pad roller 36 in the front and rear direction. The head moving mechanism 8 includes a carriage 42 on which the magnetic head 7 is mounted, a guide shaft 43 for guiding the carriage 42 in the right and left direction, a lead screw 44 for moving the carriage 42 in the right and left direction, a cam plate 45 for moving the magnetic head 7 up and down, and a turning prevention shaft 46 for preventing turning of the carriage 42 around the guide shaft 43. The carriage 42 includes a carriage main body 47 and a head holding member 48 which holds the magnetic head 7. The carriage main body 47 is attached with a female screw member 49 engaged with the lead screw 44, a slide bearing 50 engaged with the guide shaft 43, and a slide member 51 engaged with the turning prevention shaft 46. The lead screw 44 is connected with a motor 53 through a power transmission mechanism 52 structured of pulleys and a belt.

The carriage main body 47 is fixed with a fixed shaft 54, which turnably holds the head holding member 48, with the right and left direction as an axial direction. A torsion coil spring 55 is disposed between the carriage main body 47 and the head holding member 48 and the head holding member 48 is urged by an urging force of the torsion coil spring 55 so that the magnetic head 7 is moved upward with the fixed shaft 54 as a center. The cam plate 45 is formed in a long and thin elongated shape in the right and left direction and the head holding member 48 is rotatably attached with a roller 56 which is capable of abutting with cams 45a formed on both end sides in the right and left direction of the cam plate 45.

In this embodiment, when the motor 53 is driven and the lead screw 44 is rotated, the magnetic head 7 is moved in the right and left direction together with the carriage 42 along the guide shaft 43. The roller 56 is abutted with the cam 45a on both end sides in the right and left direction and, as shown by the two-dot chain line in FIG. 5, the magnetic head 7 is retreated to a lower side relative to the conveying passage 5 against an urging force of the torsion coil spring 55. On the other hand, the magnetic head 7 is moved in the right and left direction together with the carriage 42 and, when the roller 56 is disengaged from the cam 45a, the magnetic head 7 which is guided so as to be retreated by the cam 45a to a lower side relative to the conveying passage 5 is moved upward by the urging force of the torsion coil spring 55 and thereby the magnetic head 7 is capable of abutting with a magnetic stripe 2a of a card 2. When the carriage 42 is moved in the right and left direction while the magnetic head 7 is abutted with a magnetic stripe 2a, reading and recording of magnetic data are performed by the magnetic head 7. In this embodiment, the magnetic head 7 is connected with a control circuit board of the card reader 1 through a predetermined cable.

The IC contact block 9 includes, as shown in FIGS. 6(A) and 6(B), IC contact springs 59 structured to respectively contact with the external connection terminals structuring the terminal part 2b of a card 2, a spring holding member 60 holding the IC contact springs 59, and a circuit board 61 connected with the IC contact springs 59. The circuit board 61 is fixed to the spring holding member 60. The IC contact block 9 is disposed between the conveying roller 32 and the pad roller 35 and the magnetic head 7 in the front and rear direction. Further, the IC contact block 9 is disposed on a left end side in the right and left direction of the conveying passage 5 and is disposed on an upper side with respect to the conveying passage 5.

The contact block moving mechanism 10 includes a block holding member 62 to which the IC contact block 9 is fixed and a solenoid 63. The block holding member 62 is turnably held by a fixed shaft 64 which is fixed to a frame of the main body part 37 with the front and rear direction as an axial direction. A fixed pin 65 is fixed to a plunger 63a of the solenoid 63. The fixed pin 65 is engaged with an engaging groove 62a formed in the block holding member 62. The solenoid 63 is disposed so that the plunger 63a is moved in the right and left direction. A compression coil spring not shown is disposed between the main body 63b of the solenoid 63 and the plunger 63a, and the plunger 63a is urged in a direction protruding from the main body 63b by an urging force of the compression coil spring.

When the plunger 63a is protruded from the main body 63b by an urging force of the compression coil spring, as shown in FIG. 6(A), the IC contact block 9 is retreated to an upper side with respect to the conveying passage 5. In this state, when the solenoid 63 is driven, the plunger 63a is moved to the main body 63b side against the urging force of the compression coil spring and, as shown in FIG. 6(B), the IC contact block 9 is moved downward. When the IC contact block 9 is moved downward, the IC contact springs 59 are capable of contacting with the external connection terminals structuring the terminal part 2b.

The positioning mechanism 11 includes a positioning member 66 which is formed with an abutting part 66a with which a rear end of a card 2 taken into the card reader 1 is abutted, and a retreating mechanism (not shown) which makes the abutting part 66a retreat from the conveying passage 5. The abutting part 66a is disposed on a rear side relative to the magnetic head 7 in the front and rear direction. Further, the abutting part 66a is disposed on a front side relative to the conveying roller 33 and the pad roller 36 in the front and rear direction. The retreating mechanism includes a predetermined link mechanism, a drive source and the like and moves the positioning member 66 between an abutting position where a rear end of a card 2 is capable of abutting with the abutting part 66a and a retreated position where the abutting part 66a is retreated from the conveying passage 5 so that a card 2 is capable of passing toward the conveying roller 33 and the pad roller 36. In this embodiment, the positioning member 66 is normally located at the abutting position and, when a predetermined processing is to be performed, the positioning member 66 is moved to the retreated position.

Structure of Card Insertion Part

Figure 11:
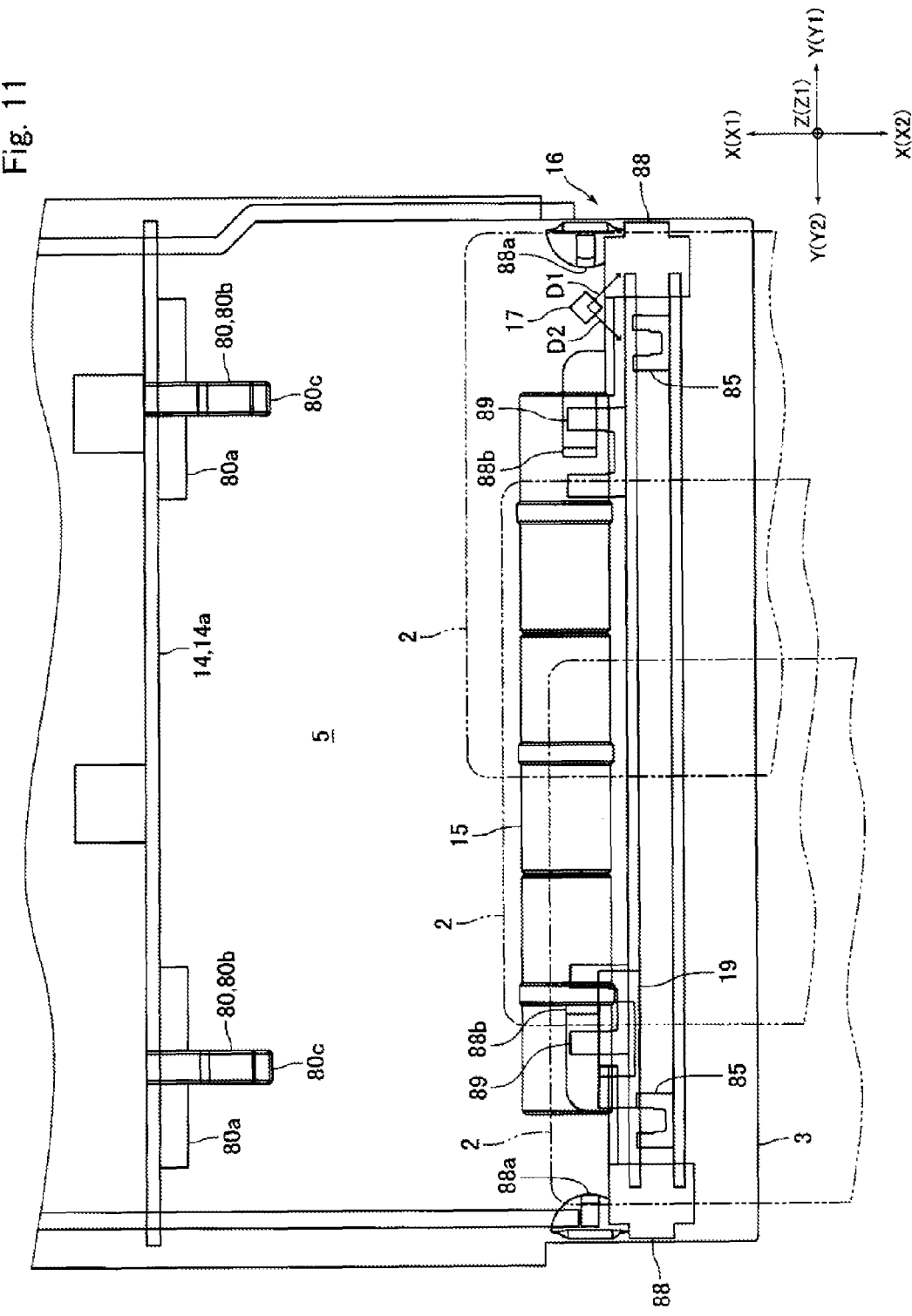
FIG. 11 is a top plan view for explaining a structure of a card insertion part shown in FIG. 2.
Figure 12A:
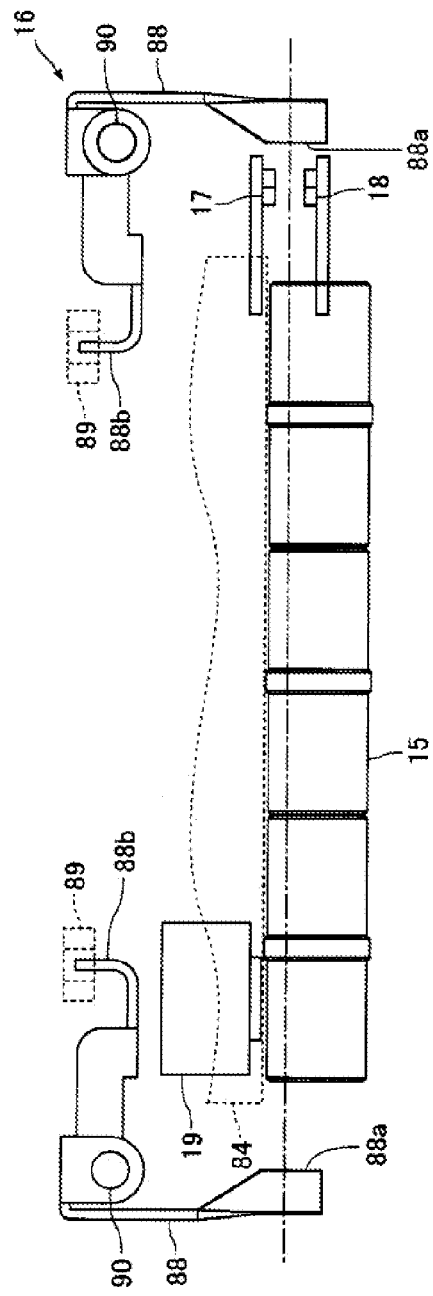
FIGS. 12(A) and 12(B) are front views for explaining a structure on a front end side of a card insertion part shown in FIG. 2.
Figure 12B:
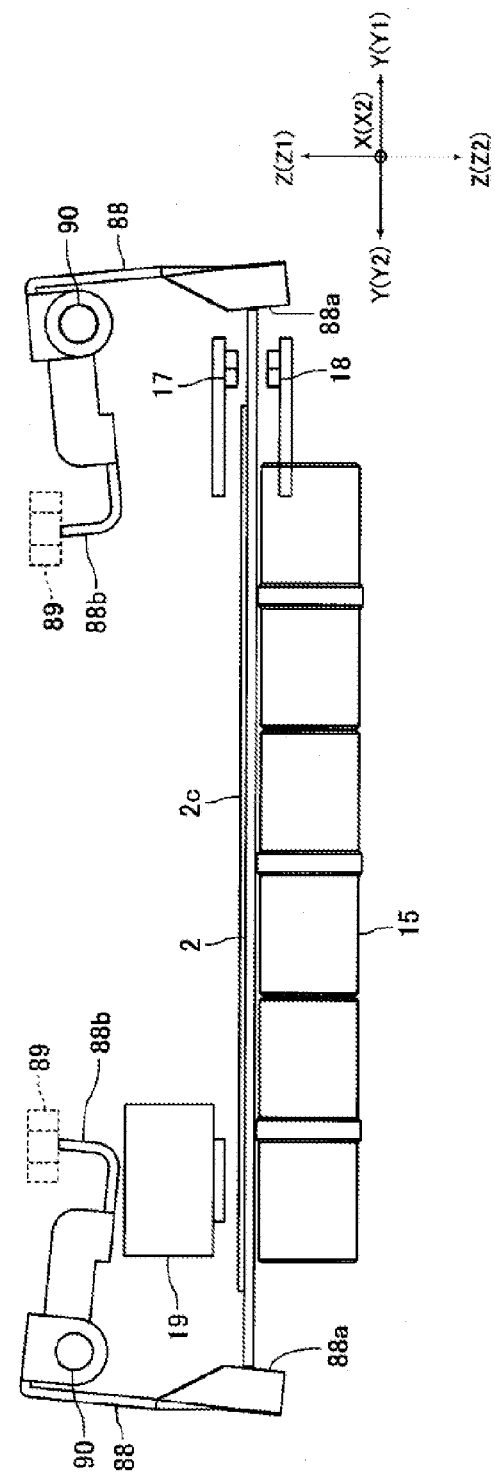

FIG. 7 is a side view for explaining a state that the shutter members 14 and 15 shown in FIG. 2 close the conveying passage 5. FIG. 8 is a side view for explaining a state that the shutter members 14 and 15 shown in FIG. 7 open the conveying passage 5. FIG. 9 is a front view for explaining a shutter drive mechanism 70 which drives the shutter member 14 shown in FIG. 2. FIG. 10 is a side view for explaining a structure on a front end side of the card insertion part 4 shown in FIG. 2. FIG. 11 is a top plan view for explaining a structure of the card insertion part 4 shown in FIG. 2. FIGS. 12(A) and 12(B) are front views for explaining a structure on a front end side of the card insertion part 4 shown in FIG. 2. FIG. 13 is a front view for explaining a positional relationship in the upper and lower direction between magnetic sensors 17 and 18 shown in FIGS. 12(A) and 12(B) and a card 2 inserted through the insertion port 3.

As described above, the card insertion part 4 includes the shutter members 14 and 15, the insertion detection mechanism 16, the magnetic sensors 17 and 18, the metal sensor 19, the infrared sensor 20 and the case body 21.

The shutter member 14 is disposed at a rear end of the card insertion part 4. The shutter member 14 is movable between a first close position (position shown in FIG. 7) where the shutter member 14 closes the conveying passage 5 and a second open position (shown in FIG. 8) where the shutter member 14 opens the conveying passage 5. A closing part 14a of the shutter member 14 for closing the conveying passage 5 at the first close position is formed in a substantially rectangular flat plate shape which is long and thin in the right and left direction. A width in the right and left direction of the closing part 14a is set to be wider than a width in the right and left direction of the conveying passage 5. In other words, the shutter member 14 located at the first close position closes the conveying passage 5 over the entire region of conveying passage 5 in the right and left direction. The shutter member 14 is connected with a shutter drive mechanism 70 which drives the shutter member 14 between the first close position and the first open position (see FIG. 9).

The shutter drive mechanism 70 includes two first link members 72, a second link member 73 and a solenoid 74. The first link member 72 is turnably held by a fixed shaft 75 which is fixed with the front and rear direction as an axial direction and is turnably connected with a lower end side of the shutter member 14. The second link member 73 is held so as to be slidable in the right and left direction by two fixed shafts 76 which are fixed with the front and rear direction as an axial direction. Two fixed pins 77 are fixed to the second link member 73 with the front and rear direction as an axial direction. The fixed pin 77 is engaged with an engaging recessed part 72a which is formed on a lower end side of the first link member 72. Further, a fixed pin 78 which is fixed to a plunger 74*a* of the solenoid 74 is engaged with the second link member 73. The solenoid 74 is disposed so that the plunger 74*a* is moved in the right and left direction. A compression coil spring not shown is disposed between a main body 74*b* of the solenoid 74 and the plunger 74*a* and the plunger 74*a* is urged in a protruding direction from the main body 74*b* by an urging force of the compression coil spring.

As shown in FIG. 9, when the plunger 74*a* is protruded from the main body 74*b* by an urging force of the compression coil spring, the shutter member 14 is located at the first close position as shown in FIG. 7 and the conveying passage 5 is closed. In this state, when the solenoid 74 is driven, the plunger 74*a* is pulled to the main body 74*b* side against an urging force of the compression coil spring and thus, the second link member 73 is slid to the left side and the first link members 72 are turned and, as a result, the shutter member 14 is moved downward. When the shutter member 14 is moved downward and is retreated to a lower side relative to the conveying passage 5, the shutter member 14 is located at the first open position as shown in FIG. 8 and the conveying passage 5 is opened. In this manner, the shutter member 14 located at the first open position is retreated to a lower side relative to the conveying passage 5 and, when the shutter member 14 located at the first open position is moved upward, the first shutter member 14 is moved to the close position. In accordance with an embodiment of the present invention, the shutter member 14 may be moved between the first close position and the first open position by power of another drive source such as a motor. In other words, the shutter drive mechanism 70 may be structured of a motor and the like.

The shutter member 14 is attached with a protruding member 80 which is protruded to a front side from a front face of the closing part 14*a*. In this embodiment, as shown in FIG. 11, two protruding members 80 are fixed to the closing part 14*a* in a separated state with a predetermined distance therebetween in the right and left direction. Specifically, the protruding member 80 is fixed to each of both end sides in the right and left direction of the closing part 14*a*. The protruding member 80 is structured of a flat plate-shaped fixed part 80*a* which is fixed to the closing part 14*a* and a flat plate-shaped protruded part 80*b* protruding to a front side from the fixed part 80*a*. A front end face of the protruded part 80*b* is formed as a card abutting face 80*c* with which, for example, a rear end of a card 2 forcibly inserted into the insertion port 3 at an unexpected speed is abutted when the shutter member 14 is located at a close position.

A distance "L1" between the card abutting face 80*c* and the insertion port 3 in the front and rear direction (see FIG. 7) is set to be shorter than a width "W1" in the short widthwise direction of a card 2. In this embodiment, the distance "L1" is set so that a user is capable of holding a front end side of the card 2 which is protruded from the insertion port 3 when a rear end of a card 2 inserted into the insertion port 3 so that the short widthwise direction of the card 2 is coincided with the front and rear direction is abutted with the card abutting face 80*c*. For example, the distance "L1" is set to be shorter by 10-15 mm than the width "W1". In this embodiment, the distance "L2" in the front and rear direction between a front face of the closing part 14*a* and the insertion port 3 (see FIG. 7) is set to be slightly shorter than the width "W1". However, the distance "L2" may be the same as the width "W1" or may be longer than the width "W1".

The shutter member 15 is disposed on a front side relative to the shutter member 14. Specifically, the shutter member 15 is disposed on a front side relative to the conveying roller 31 and the pad roller 34. The shutter member 15 in this embodiment is a rotatable roller with the right and left direction as an axial direction of rotation. The shutter member 15 is rotatably held by a shaft 81 which is disposed with the right and left direction as an axial direction. The shaft 81 is fixed to an upper end side of the shaft holding member 82. The shaft holding member 82 is turnably held by a fixed shaft 83 which is fixed to a frame of the card insertion part 4 with the right and left direction as an axial direction. The shaft 81, the shaft holding member 82 and the fixed shaft 83 are disposed on a lower side relative to the conveying passage 5. The shutter member 15 in this embodiment is structured of three rollers which are divided in the right and left direction. The three rollers are held by the shaft 81 so as to contact with each other in the right and left direction.

The shutter member 15 is capable of turning together with a shaft holding member 82 with a fixed shaft 83 as a center. Specifically, the shutter member 15 is movable between a second close position (position shown in FIG. 7) where the shutter member 15 is disposed in the conveying passage 5 to close the conveying passage 5 and a second open position (position shown in FIG. 8) where the shutter member 15 is retreated to a lower side relative to the conveying passage 5 to open the conveying passage 5. In other words, the shutter member 15 is capable of protruding to and retreating from the conveying passage 5. The shaft holding member 82 is urged by an urging member such as a spring not shown (for example, a torsion coil spring or a tension coil spring) in a direction so that the shutter member 15 is moved upward. In other words, the shutter member 15 is urged toward the second close position by the urging member. An abutting member 84 with which an upper end of the shutter member 15 urged toward the second close position is capable of abutting is disposed on an upper side with respect to the shutter member 15, and an upper end of the shutter member 15 when located at the second close position is abutted with an under face of the abutting member 84. The abutting member 84 is fixed to a frame of the card insertion part 4 and is disposed on an upper side relative to the conveying passage 5.

In a standby state before a card 2 is inserted into the card reader 1, the shutter member 15 is urged toward the second close position by an urging force of the urging member which urges the shaft holding member 82 and is located at the second close position where the conveying passage 5 is closed. In this state, when a card 2 inserted into the insertion port 3 is contacted with the shutter member 15, the shutter member 15 is retreated to a lower side against the urging force of the urging member and is moved to the second open position. In other words, when a card 2 inserted into the insertion port 3 is contacted with the shutter member 15, the shutter member 15 is moved to the second open position. The upper end of the shutter member 15 at the second open position contacts with a front face or a rear face of the card 2. In other words, the shutter member 15 in this embodiment is a card contact member which is capable of protruding to and retreating from the conveying passage 5 and is capable of contacting with a front face or a rear face of the card 2. In this embodiment, when the shutter member 15 is located at the close position, an upper portion of the shutter member 15 relative to the shaft 81 closes the conveying passage 5.

The shutter member 15 is, when a card 2 is inserted into the insertion port 3 so that a longitudinal direction of the card 2 is coincided with the front and rear direction, disposed at a position where the inserted card 2 is contacted even when the card 2 is inserted at any position in the right and left direction (see FIG. 11). Further, when a card 2 is inserted into the insertion port 3 so that a longitudinal direction of the card 2 is coincided with the front and rear direction, a width of the shutter member 15 (width in the right and left direction) is set so that the inserted card 2 is contacted with the shutter member 15 even when the card 2 is inserted at any position in the right and left direction. Therefore, in addition to a case that a card 2 is inserted into the insertion port 3 so that a short widthwise direction of the card 2 is coincided with the front and rear direction, even in a case that a card 2 is inserted into the insertion port 3 so that a longitudinal direction of the card 2 is coincided with the front and rear direction, the shutter member 15 located at the second close position is moved to the second open position. In this embodiment, a width of the shutter member 15 (width in the right and left direction) is set to be narrower than a width of the conveying passage 5 (width in the right and left direction). However, a width of the shutter member 15 may be the same as the width of the conveying passage 5 or may be wider than the width of the conveying passage 5.

Further, the card insertion part 4 includes a sensor 85 as a shutter member sensor for detecting that the shutter member 15 has moved to the second open position. In other words, the card insertion part 4 includes the sensor 85 for detecting a protruding-retreating state of the shutter member 15 to or from the conveying passage 5. The sensor 85 is a transmission type optical sensor having a light emitting element and a light receiving element which receives light from the light emitting element. The shaft holding member 82 is formed with a light intercepting part 82a for intercepting between the light emitting element and the light receiving element of the sensor 85. In other words, the sensor 85 in this embodiment is a contact member sensor which detects a protruding-retreating state of the shutter member 15, which is a card contact member, to or from the conveying passage 5.

When the shutter member 15 is located at the second close position, as shown in FIG. 7, the light intercepting part 82a is separated from between the light emitting element and the light receiving element of the sensor 85. On the other hand, when the shutter member 15 is located at the second open position, as shown in FIG. 8, the light intercepting part 82a intercepts between the light emitting element and the light receiving element of the sensor 85. Therefore, light from the light emitting element to the light receiving element of the sensor 85 is intercepted by the light intercepting part 82a and thereby it is detected that a card 2 has been inserted into the insertion port 3 and the shutter member 15 has been moved to the open position. In this embodiment, a second insertion detection mechanism which is structured to contact with a front face or a rear face of a card 2 and to detect the card 2 having been inserted into the insertion port 3 is structured of the shutter member 15, the shaft 81, the shaft holding member 82, the fixed shaft 83, the sensor 85 and the like.

An insertion detection mechanism 16 is disposed on a front side relative to the shutter member 14. Specifically, the insertion detection mechanism 16 is disposed at substantially the same position as the shutter member 15 in the front and rear direction. More specifically, a card contact part 88a described below is disposed at substantially the same position as the shutter member 15 in the front and rear direction. The insertion detection mechanism 16 includes two detection levers 88 as a second card contact member, which are disposed on both end sides in the right and left of the card insertion part 4 and are capable of protruding to and retreating from the conveying passage 5, and two sensors 89 as a second contact member sensor for detecting respective movements of the two detection levers 88 (in other words, for detecting a protruding-retreating state of the detection lever 88 to and from the conveying passage 5. The sensor 89 is a transmission type optical sensor having a light emitting element and a light receiving element which receives light from the light emitting element.

The detection lever 88 is provided with a card contact part 88a, which is capable of protruding to and retreating from the conveying passage 5 on an end side in the right and left direction of the conveying passage 5 and of contacting with an end part in the right and left direction of a card 2, and a light intercepting part 88b for intercepting between the light emitting element and the light receiving element of the sensor 89. An upper side of the card contact part 88a is turnably held by a fixed shaft 90 (see FIGS. 12(A) and 12(B)) which is fixed to a frame of the card insertion part 4 with the front and rear direction as an axial direction. Further, the detection lever 88 is urged so that the card contact part 88a is moved to an inner side in the right and left direction by an urging member such as a spring not shown.

In a standby state before a card 2 is inserted into the card reader 1, the card contact part 88a is disposed in an inside of the conveying passage 5 by an urging force of the urging member. In this case, as shown in FIG. 12(A), the light intercepting part 88b intercepts between the light emitting element and the light receiving element of the sensor 89. In this state, when a card 2 is inserted into the insertion port 3 so that a short widthwise direction of the card 2 is coincided with the front and rear direction, both ends in the right and left direction of the card 2 are respectively contacted with the two detection levers 88 to turn the detection levers 88 with the fixed shaft 90 as a turning center. When the detection lever 88 is turned, as shown in FIG. 12(B), the light intercepting part 88b is separated from between the light emitting element and the light receiving element of the sensor 89.

Therefore, the light receiving element receives light from the light emitting element in the two sensors 89 and thereby it is detected that a card 2 has been inserted into the insertion port 3 so that a short widthwise direction of the card 2 is coincided with the front and rear direction. The insertion detection mechanism 16 in this embodiment is a first insertion detection mechanism which detects both ends in the right and left direction of a card 2 and thereby detects a card 2 inserted into the insertion port 3 so that a short widthwise direction of the card 2 is coincided with the front and rear direction. In this embodiment, when a card 2 is inserted into the insertion port 3 so that a longitudinal direction of the card 2 is coincided with the front and rear direction, only one of two detection levers 88 is turned and the other detection lever 88 is not turned, or neither of two detection levers 88 are turned. Therefore, when a card 2 is inserted into the insertion port 3 so that a longitudinal direction of the card 2 is coincided with the front and rear direction, light from the light emitting element is received by the light receiving element in only one of two sensors 89 or, the light receiving element does not receive light from the light emitting element in both of the two sensors 89.

Magnetic sensors 17 and 18 are a flux gate sensor which includes an exciting coil, a detection coil and a core around which the exciting coil and the detection coil are wound. Further, the magnetic sensors 17 and 18 are a triaxial magnetic sensor for sensing magnetism in three directions perpendicular to each other (in other words, three directions perpendicular to each other are magnetic detection directions). The magnetic sensors 17 and 18 output an output signal having a level depending on a distance from a magnetic body. Specifically, levels of output signals from the magnetic sensors 17 and 18 become higher as the distances between the magnetic body and the magnetic sensors 17 and 18 become shorter. Further, the magnetic sensor 17 and the magnetic sensor 18 have the same structure as each other and are adjusted so that their sensibilities are equal to each other. In accordance with an embodiment of the present invention, the magnetic sensors 17 and 18 may be a magnetic impedance sensor (MI sensor) which detects magnetic data by utilizing magnetic impedance. Further, the magnetic sensors 17 and 18 may be a sensor which detects magnetic data by utilizing a magneto-resistance effect or a Hall effect.

The magnetic sensors 17 and 18 are disposed on a front side relative to the shutter member 14. Specifically, the magnetic sensors 17 and 18 are disposed at substantially the same position as the shutter member 15 in the front and rear direction. Further, the magnetic sensors 17 and 18 are disposed in the right and left direction at positions where a card 2 is passed. Specifically, the magnetic sensors 17 and 18 are disposed on a right end side of the conveying passage 5. More specifically, as shown in FIG. 12(B), the magnetic sensors 17 and 18 are disposed at positions in the right and left direction where an embossing area 2c of a card 2 inserted so that a short widthwise direction of the card 2 is coincided with the front and rear direction is avoided.

Further, the magnetic sensors 17 and 18 are disposed so as to interpose a card 2 inserted into the insertion port 3 therebetween in the upper and lower direction. Further, the magnetic sensors 17 and 18 are disposed so that at least parts of them are overlapped with each other when viewed in the upper and lower direction. In this embodiment, when viewed in the upper and lower direction, the magnetic sensors 17 and 18 are disposed so that the magnetic sensor 17 and the magnetic sensor 18 are completely overlapped with each other. Further, in this embodiment, the magnetic sensor 17 is disposed on an upper side relative to the conveying passage 5 and the magnetic sensor 18 is disposed on a lower side relative to the conveying passage 5. The magnetic sensor 17 is disposed so that its magnetosensitive surface faces a lower side and the magnetic sensor 18 is disposed so that its magnetosensitive surface faces an upper side.

In addition, the magnetic sensors 17 and 18 are disposed so that one of the magnetic detection directions is parallel to the upper and lower direction. Further, the magnetic sensor 17 is disposed so that the remaining two magnetism detection directions are inclined with respect to the front and rear direction (directions shown by the arrows "D1" and "D2" in FIG. 11) when viewed in the upper and lower direction. Similarly, the magnetic sensor 18 is disposed so that the remaining two magnetism detection directions are inclined with respect to the front and rear direction when viewed in the upper and lower direction. Specifically, when viewed in the upper and lower direction, the remaining two magnetic detection directions of the magnetic sensors 17 and 18 are inclined by about 45° with respect to the front and rear direction and to the right and left direction. Further, when viewed in the upper and lower direction, the remaining two magnetic detection directions of the magnetic sensors 17 and 18 are directed in obliquely front directions. In accordance with an embodiment of the present invention, when viewed in the upper and lower direction, the remaining two magnetic detection directions of the magnetic sensors 17 and 18 may be inclined by other than 45° with respect to the front and rear direction and to the right and left direction.

Further, the magnetic sensors 17 and 18 are, as shown in FIG. 13, disposed so as to have a space to a front face and to a rear face of a card 2 having been inserted into the insertion port 3. Specifically, the magnetic sensors 17 and 18 are disposed so that a distance "L11" between an under face of a card 2 inserted into the insertion port 3 and an under face of the magnetic sensor 17 is longer than a distance "L12" between the under face of the card 2 inserted into the insertion port 3 and an upper face of the magnetic sensor 18 and, in addition, so that a distance "L13" between an upper face of the card 2 inserted into the insertion port 3 and the under face of the magnetic sensor 17 is shorter than a distance "L14" between the upper face of the card 2 inserted into the insertion port 3 and the upper face of the magnetic sensor 18.

Therefore, when a card 2 is inserted into the insertion port 3 so that a short widthwise direction of a card 2 is coincided with the front and rear direction and, in addition, in a state that a rear face of the card 2 faces a lower side, a level of an output signal outputted from the magnetic sensor 18 is higher than a level of an output signal outputted from the magnetic sensor 17. On the other hand, when a card 2 is inserted into the insertion port 3 so that a short widthwise direction of a card 2 is coincided with the front and rear direction and, in addition, in a state that a front face of the card 2 faces a lower side, a level of an output signal outputted from the magnetic sensor 17 is higher than a level of an output signal outputted from the magnetic sensor 18. Therefore, it is detected whether a card 2 is inserted into the insertion port 3 in a state that its rear face faces a lower side, or the card 2 is inserted into the insertion port 3 in a state that its front face faces a lower side by comparing a level of an output signal from the magnetic sensor 17 with a level of an output signal from the magnetic sensor 18.

The metal sensor 19 is a magnetic type sensor which includes an excitation coil, a detection coil and a core around which the excitation coil and the detection coil are wound. The metal sensor 19 detects a metal member by detecting a variation of a magnetic field generated by the excitation coil with the detection coil. The metal sensor 19 is disposed on a front side relative to the shutter member 14. Specifically, the metal sensor 19 is disposed on a slightly front side relative to the magnetic sensors 17 and 18 in the front and rear direction. Further, the metal sensor 19 is disposed at a position in the right and left direction where a terminal part 2b of a card 2 inserted in a correct attitude is passed. Specifically, the metal sensor 19 is disposed on a left end side of the conveying passage 5. In addition, the metal sensor 19 is disposed on an upper side relative to the conveying passage 5. Further, the metal sensor 19 is disposed so that its magnetosensitive surface faces a lower side.

In this embodiment, when a card 2 is inserted from one end 2d side in a short widthwise direction of the card 2 in a state that its rear face faces a lower side, a terminal part 2b of the card 2 is detected by the metal sensor 19. Further, even when a card 2 is inserted from the other end 2e side in a short widthwise direction of the card 2 in a state that its front face faces a lower side, the terminal part 2b of the card 2 is detected by the metal sensor 19. Therefore, based on detected results of the magnetic sensors 17 and 18 and a detected result of the metal sensor 19, it is detected whether a card 2 has been inserted from the one end 2d side of the card 2 or the card 2 has been inserted from the other end 2e side of the card 2.

The infrared sensor 20 is a pyroelectric type infrared sensor and includes a pyroelectric element for detecting light including infrared rays by pyroelectric effect. As described above, the infrared sensor 20 detects a human motion ahead of the card reader 1. Specifically, the infrared sensor 20 detects a motion of a human hand or the like ahead of the card reader 1. Further, based on the infrared rays generated by a human being ahead of the card reader 1, the infrared sensor 20 detects a difference or the like between a body temperature of the human being ahead of the card reader 1 and an ambient temperature of the human being in a detecting range of the infrared sensor 20 and thereby motion of the human being ahead of the card reader 1 is detected. As shown in FIG. 1, the infrared sensor 20 is disposed on the front face side of the card insertion part 4.

A case body 21 is formed of resin material having a light-transmitting property. Specifically, the case body 21 is formed of transparent resin material. A lower side portion of the case body 21 relative to the shutter member 15 is formed with an opening part (not shown) penetrating through in the upper and lower direction. In other words, a lower side portion of the case body 21 relative to the shutter member 15 is formed with an opening part reaching to an outer side with respect to the card reader 1. The opening part is, for example, formed over a turning range of the shaft holding member 82 which turns with the fixed shaft 83 as a center and the opening part functions to prevent the shaft holding member 82 from contacting with the case body 21.

As described above, in a standby state before a card 2 is inserted into the insertion port 3, the shutter member 14 is located at the first close position and thus the conveying passage 5 is closed. The shutter drive mechanism 70 drives the shutter member 14 based on detected results of the magnetic sensors 17 and 18, the metal sensor 19 and the sensors 85 and 89 to move the shutter member 14 to the first open position. Specifically, when it is detected that a card 2 has been inserted into the insertion port 3 based on a detected result of the sensor 85 and, when it is detected that the card 2 has been inserted into the insertion port 3 so that a short widthwise direction of the card 2 is coincided with the front and rear direction based on detected results of the sensors 89 and, when it is detected that the card 2 having a terminal part 2b and on which magnetic data are recorded has been inserted from one end 2d side of the card 2 in a state that its rear face faces a lower side based on detected results of the magnetic sensors 17 and 18 and the metal sensor 19, the shutter drive mechanism 70 moves the shutter member 14 to an open position. In other words, when it is detected that a normal card 2 has been inserted into the insertion port 3 in a correct attitude, the shutter drive mechanism 70 moves the shutter member 14 to the first open position.

When it is detected that a normal card 2 has been inserted into the insertion port 3 in a correct attitude, the motor 39 is activated to convey the card 2 to a rear side by the card conveying mechanism 6 until the one end 2d of the card 2 is abutted with the abutting part 66a of the positioning member 66. Further, after that, the motor 53 is activated to move the magnetic head 7 in the right and left direction while abutting with a magnetic stripe 2a of the card 2 and thereby reading or recording of magnetic data is performed. Further, the solenoid 63 is activated to make the IC contact springs 59 contact with an external connection terminal structuring the terminal part 2b of the card 2 and thereby data communication is performed with the card 2. In this embodiment, when the one end 2d of the card 2 is abutted with the abutting part 66a, the entire card 2 is located on a rear side relative to the shutter member 14 and, when the card 2 inserted from the insertion port 3 has been completely taken to a rear side relative to the shutter member 14, the shutter member 14 is moved to the first close position and the conveying passage 5 is closed.

Principal Effects in this Embodiment

As described above, in this embodiment, the shutter member 14 is attached with the protruding member 80 which protrudes to a front side from a front face of the closing part 14a of the shutter member 14. Further, in this embodiment, in a case that a rear end of the card 2 inserted into the insertion port 3 so that a short widthwise direction of the card 2 and the front and rear direction are coincided with each other is abutted with the card abutting face 80c of the protruding member 80, the distance "L1" between the card abutting face 80c and the insertion port 3 in the front and rear direction is set so that a user is capable of holding a front end side of the card 2 which is protruded from the insertion port 3. Therefore, in this embodiment, even in a case that a distance between the insertion port 3 and the shutter member 14 in the front and rear direction (specifically, the distance "L2" between a front face of the closing part 14a and the insertion port 3) is set to be longer, when a card 2 is forcibly inserted into the insertion port 3 in a state that the closing part 14a has closed the conveying passage 5, the card 2 is abutted with the card abutting face 80c and a user is capable of holding a front end part of the card 2 abutting with the card abutting face 80c. Accordingly, in this embodiment, even when a distance between the insertion port 3 and the shutter member 14 in the front and rear direction is secured, a user is capable of holding a front end part of the card 2 which is forcibly inserted in a state that the conveying passage 5 is closed by the closing part 14a.

Further, in this embodiment, a distance between the insertion port 3 and the shutter member 14 in the front and rear direction can be secured. Therefore, even when the shutter member 14 is structured so that the conveying passage 5 is closed over the entire region of the conveying passage 5 in the right and left direction and a space occupied by the shutter member 14 is large, the second insertion detection mechanism comprised of the shutter member 15 and the like, the insertion detection mechanism 16, the magnetic sensors 17 and 18 and the metal sensor 19 can be easily disposed between the insertion port 3 and the shutter member 14 in the front and rear direction. Further, in this embodiment, a distance in the front and rear direction between the insertion port 3 and the shutter member 14 can be secured. Therefore, the conveying roller 31 and the pad roller 34 can be easily disposed between the insertion port 3 and the shutter member 14 in the front and rear direction.

In this embodiment, the shutter member 14 is structured so as to close the conveying passage 5 over the entire region of the conveying passage 5 in the right and left direction and thus mischief to the card reader 1 can be prevented effectively. Further, in this embodiment, the second insertion detection mechanism comprised of the shutter member 15 and the like, the insertion detection mechanism 16, the magnetic sensors 17 and 18 and the metal sensor 19 are disposed between the insertion port 3 and the shutter member 14 in the front and rear direction. Therefore, it can be detected that a normal card 2 has been inserted into the insertion port 3 in a correct attitude. As a result, in this embodiment, when a normal card 2 has been inserted in a correct attitude into the insertion port 3, the shutter member 14 is capable of moving to the open position and, when a card other than a normal card 2 has been inserted into the insertion port 3 or, when a normal card 2 has been inserted in an incorrect attitude into the insertion port 3, the shutter member 14 is remained at the close position.

In addition, in this embodiment, the conveying roller 31 and the pad roller 34 are disposed between the insertion port 3 and the shutter member 14 in the front and rear direction. Therefore, even when a card 2 is conveyed in a short widthwise direction of the card 2, the card 2 inserted into the insertion port 3 can be taken into a rear side of the card reader 1 and the card 2 can be appropriately ejected from the insertion port 3 by using the conveying roller 31 and the pad roller 34 disposed on a front side relative to the shutter member 14.

In this embodiment, two protruding members 80 are fixed to the closing part 14a in a separated state with a predetermined distance therebetween in the right and left direction. Therefore, in a state that the conveying passage 5 is closed by the closing part 14a, a card 2 forcibly inserted into the insertion port 3 is capable of being abutted with two card abutting faces 80c. Accordingly, in this embodiment, a state of the card 2 abutted with the card abutting face 80c can be stabilized.

Further, in this embodiment, the card insertion part 4 includes the shutter member 15 capable of protruding to and retreating from the conveying passage 5 and of contacting with a front face or a rear face of the card 2, and the sensor 85 which detects a protruding-retreating state of the shutter member 15 to or from the conveying passage 5. Further, in this embodiment, the shutter member 15 is, when a card 2 is inserted into the insertion port 3 so that a longitudinal direction of the card 2 is coincided with the front and rear direction, disposed at a position where the inserted card 2 is contacted even when the card 2 is inserted at any position in the right and left direction. Further, when a card 2 is inserted into the insertion port 3 so that a longitudinal direction of the card 2 is coincided with the front and rear direction, a width of the shutter member 15 (width in the right and left direction) is set so that the inserted card 2 is contacted with the shutter member 15 even when the card 2 is inserted at any position in the right and left direction.

Therefore, in this embodiment, as described above, in addition to a case that a card 2 is inserted into the insertion port 3 so that a short widthwise direction of the card 2 is coincided with the front and rear direction, even in a case that a card 2 is inserted into the insertion port 3 so that a longitudinal direction of the card 2 is coincided with the front and rear direction, the shutter member 15 located at the closed position is moved to the open position and the sensor 85 detects the shutter member 15 having been moved to the open position. Therefore, in this embodiment, in addition to a case that a card 2 is inserted into the insertion port 3 so that a short widthwise direction of the card 2 is coincided with the front and rear direction, even in a case that a card 2 is inserted into the insertion port 3 so that a longitudinal direction of the card 2 is coincided with the front and rear direction, it can be detected by the sensor 85 that a card 2 has been inserted into the insertion port 3.

Further, in this embodiment, the card insertion part 4 includes the insertion detection mechanism 16 which detects a card 2 inserted into the insertion port 3 so that a short widthwise direction of the card 2 and the front and rear direction are coincided with each other. Therefore, in this embodiment, based on detected results of the sensors 89 structuring the insertion detection mechanism 16, it can be detected that a card 2 has been inserted into the insertion port 3 so that a short widthwise direction of the card 2 and the front and rear direction are coincided with each other. Further, in this embodiment, in a case that the sensors 89 do not detect a card 2 inserted into the insertion port 3 so that a short widthwise direction of the card 2 and the front and rear direction are coincided with each other, but that it is detected by the sensor 85 that a card 2 has been inserted into the insertion port 3, it can be detected that a card 2 has been inserted into the insertion port 3 so that a longitudinal direction of the card 2 is coincided with the front and rear direction based on detected results of the sensors 85 and 89. Therefore, in this embodiment, based on the detected results of the sensors 85 and 89, it can be detected whether a card 2 has been inserted into the insertion port 3 so that a short widthwise direction of the card 2 is coincided with the front and rear direction, or a card 2 has been inserted into the insertion port 3 so that a longitudinal direction of the card 2 is coincided with the front and rear direction.

In this embodiment, the card insertion part 4 includes the magnetic sensors 17 and 18 and the metal sensor 19. Therefore, based on detected results of the magnetic sensors 17 and 18 and a detected result of the metal sensor 19, it can be determined whether a normal card 2 having a terminal part 2b and on which magnetic data are recorded has been inserted into the insertion port 3, or a card other than a normal card 2 has been inserted into the insertion port 3.

Further, in this embodiment, the magnetic sensors 17 and 18 are disposed so as to interpose a card 2 inserted into the insertion port 3 in the upper and lower direction and, so that a distance "L11" between an under face of the card 2 inserted into the insertion port 3 and an under face of the magnetic sensor 17 is longer than a distance "L12" between the under face of the card 2 inserted into the insertion port 3 and an upper face of the magnetic sensor 18 and, in addition, so that a distance "L13" between an upper face of the card 2 inserted into the insertion port 3 and the under face of the magnetic sensor 17 is shorter than a distance "L14" between the upper face of the card 2 inserted into the insertion port 3 and the upper face of the magnetic sensor 18. Therefore, in this embodiment, as described above, it can be detected whether a card 2 has been inserted into the insertion port 3 in a state that its rear face faces a lower side, or the card 2 has been inserted into the insertion port 3 in a state that its front face faces a lower side. Further, in this embodiment, as described above, based on detected results of the magnetic sensors 17 and 18 and a detected result of the metal sensor 19, it can be detected whether a card 2 has been inserted from one end 2d side of the card 2, or a card 2 has been inserted from the other end 2e side of the card 2.

In this embodiment, as described above, based on detected results of the sensors 85 and 89, detected results of the magnetic sensors 17 and 18, and a detected result of the metal sensor 19, it can be detected that a card 2 having a terminal part 2b and on which magnetic data are recorded has been inserted from one end 2d side of the card 2 so that its short widthwise direction is coincided with the front and rear direction in a state that its rear face faces a lower side. In other words, in this embodiment, it can be detected that a normal card 2 has been inserted into the insertion port 3 in a correct attitude.

In this embodiment, the magnetic sensors 17 and 18 are disposed in the right and left direction at positions avoiding an embossing area 2c of a card 2 inserted so that a short widthwise direction of the card 2 is coincided with the front and rear direction. Therefore, in this embodiment, distances in the upper and lower direction between a card 2 passing through the conveying passage 5 and the magnetic sensors 17 and 18 can be made smaller and, as a result, detection accuracy of magnetic data by the magnetic sensors 17 and 18 can be enhanced. In other words, in a case that the magnetic sensors 17 and 18 are disposed at positions overlapping with the embossing area 2c in the upper and lower direction, the distances in the upper and lower direction between the card 2 passing through the conveying passage 5 and the magnetic sensors 17 and 18 are required to increase for preventing characters, digits and the like protruded from a front face of the card 2 by embossing from contacting with the magnetic sensors 17 and 18 and thus detection accuracy of magnetic data by the magnetic sensors 17 and 18 may be lowered. On the other hand, according to this embodiment, the distances in the upper and lower direction between the card 2 passing through the conveying passage 5 and the magnetic sensors 17 and 18 can be made smaller and, as a result, detection accuracy of magnetic data by the magnetic sensors 17 and 18 can be enhanced.

Further, in this embodiment, the shutter member 14 is disposed on a rear side with respect to the insertion port 3. Further, in this embodiment, in a standby state before a card 2 is inserted, the shutter member 14 is located at the first closed position and, when it is detected that a normal card 2 has been inserted into the insertion port 3 in a correct attitude, the shutter drive mechanism 70 moves the shutter member 14 to the first open position. Therefore, in this embodiment, a card other than a normal card 2 and a card 2 inserted in an incorrect attitude are prevented from being taken into the main body part 37 of the card reader 1 or mischief and the like can be prevented.

Further, in this embodiment, the shutter member 15 is disposed on a front side relative to the shutter member 14. The shutter member 15 is urged toward the second closed position by an urging member which urges the shaft holding member 82 and, when a card 2 inserted into the insertion port 3 is contacted, the shutter member 15 is moved to the second open position. In other words, in this embodiment, when a card 2 is not inserted, the shutter member 15 always closes the conveying passage 5 by an urging force of the urging member. Therefore, in this embodiment, even when the shutter member 14 is disposed at a rear end of the card insertion part 4 and a distance between the shutter member 14 and the insertion port 3 is long, dust, water and the like are restrained from entering into an inside of the card insertion part 4 by the shutter member 15 which is disposed on a front side relative to the shutter member 14. Specifically, dust, water and the like can be restrained from entering to a rear side with respect to the shutter member 15 and the abutting member 84. Therefore, in this embodiment, dust, water and the like can be restrained from being accumulated in the inside of the card insertion part 4.

Especially, in this embodiment, an opening part communicating with the outside of the card reader 1 is formed in a lower side portion of the case body 21 with respect to the shutter member 15. Therefore, dust, water and the like prevented from entering to the inside of the card insertion part 4 by the shutter member 15 can be discharged through the opening part to the outside of the card insertion part 4. Accordingly, in this embodiment, dust, water and the like can be restrained from being accumulated in the inside of the card insertion part 4.

In this embodiment, the shutter member 15 is urged toward the second closed position by an urging member which urges the shaft holding member 82 and, when contacted with a card 2 inserted into the insertion port 3, the shutter member 15 is moved to the second open position. Therefore, in this embodiment, no drive mechanism for driving the shutter member 15 is required. Accordingly, in this embodiment, the structure of the card reader 1 can be simplified.

In this embodiment, the shutter member 15 is a roller which is capable of rotating with the right and left direction as an axial direction of rotation and thus it rotates when contacted with a card 2. Therefore, in this embodiment, conveyance resistance of a card 2 when the card 2 is contacted with the shutter member 15 can be reduced.

In this embodiment, the card insertion part 4 includes the sensor 85 for detecting that the shutter member 15 has been moved to the second open position, and the shaft holding member 82 rotatably holding the shutter member 15 is formed with the light intercepting part 82a for intercepting between a light emitting element and a light receiving element of the sensor 85. Therefore, in this embodiment, it can be detected that a card 2 has been inserted into the insertion port 3 by using the shutter member 15, the shaft holding member 82, the sensor 85 and the like.

In this embodiment, in a case that a card 2 has been inserted into the insertion port 3 so that a longitudinal direction of the card 2 is coincided with the front and rear direction, the shutter member 15 is disposed at a position so as to be capable of contacting with the inserted card 2 even when the card 2 is inserted at any position in the right and left direction. Further, in this embodiment, in a case that a card 2 has been inserted into the insertion port 3 so that a longitudinal direction of the card 2 is coincided with the front and rear direction, a width in the right and left direction of the shutter member 15 is set so that the inserted card 2 is contacted with the shutter member 15 even when the card 2 is inserted at any position in the right and left direction. Therefore, in this embodiment, as described above, in addition to a case that a card 2 is inserted into the insertion port 3 so that a short widthwise direction of the card 2 is coincided with the front and rear direction, even in a case that a card 2 is inserted into the insertion port 3 so that a longitudinal direction of the card 2 is coincided with the front and rear direction, the shutter member 15 located at the second closed position is moved to the second open position. Accordingly, in this embodiment, in addition to a case that a card 2 is inserted into the insertion port 3 so that a short widthwise direction of the card 2 is coincided with the front and rear direction, even in a case that a card 2 is inserted into the insertion port 3 so that a longitudinal direction of the card 2 is coincided with the front and rear direction, it can be detected that a card 2 has been inserted into the insertion port 3 by using the shutter member 15, the shaft holding member 82, the sensor 85 and the like.

In this embodiment, the shutter member 14 is attached with the protruding member 80 which protrudes to a front side from a front face of the closing part 14a of the shutter member 14. Further, in this embodiment, the distance "L1" between the card abutting face 80c and the insertion port 3 in the front and rear direction is set so that, when a rear end of a card 2 inserted into the insertion port 3 so that the short widthwise direction of the card 2 is coincided with the front and rear direction is abutted with the card abutting face 80c, a user is capable of holding a front end side of the card 2 which is protruded from the insertion port 3. Therefore, in this embodiment, even in a case that a distance between the insertion port 3 and the shutter member 14 in the front and rear direction (specifically, the distance "L2" between a front face of the closing part 14a and the insertion port 3) is set to be longer, when a card 2 is forcibly inserted into the insertion port 3 in a state that the closing part 14a has closed the conveying passage 5, the card 2 is abutted with the card abutting face 80c and a user is capable of holding a front end part of the card 2 abutting with the card abutting face 80c. Accordingly, in this embodiment, even when a distance between the insertion port 3 and the shutter member 14 in the front and rear direction is secured, a user is capable of holding a front end part of the card 2 which is forcibly inserted in a state that the conveying passage 5 is closed by the closing part 14a.

Other Embodiments

Although the present invention has been shown and described with reference to a specific embodiment, various changes and modifications will be apparent to those skilled in the art from the teachings herein.

In the embodiment described above, the shutter member 14 is fixed with two protruding members 80 in a separated state with a predetermined distance therebetween in the right and left direction. However, the present invention is not limited to this embodiment. For example, three or more protruding members 80 may be fixed to the shutter member 14. Also in this case, a state of a card 2 abutting with the card abutting face 80c can be stabilized. Further, only one protruding member 80 may be fixed to the shutter member 14. Further, the card reader 1 may include no shutter member 15.

In the embodiment described above, the shutter member 14 located at the first open position is retreated to a lower side with respect to the conveying passage 5. However, the present invention is not limited to this embodiment. For example, the shutter member 14 located at the first open position may be retreated to an upper side with respect to the conveying passage 5. Further, in the embodiment described above, the shutter member 15 located at the second open position is retreated to a lower side with respect to the conveying passage 5. However, the shutter member 15 located at the second open position may be retreated to an upper side with respect to the conveying passage 5. Further, in the embodiment described above, the abutting member 84 is disposed on an upper side with respect to the shutter member 15. However, instead of the abutting member 84, another shutter member which is movable between a closed position closing the conveying passage 5 and an open position opening the conveying passage 5 and is urged to a lower side by an urging member such as a spring may be disposed on an upper side with respect to the shutter member 15. In this case, for example, the card insertion part 4 includes a sensor for detecting that the shutter member has been moved to the open position.

In the embodiment described above, the shutter member 15 is structured of three rollers which are divided in the right and left direction. However, the present invention is not limited to this embodiment. For example, the shutter member 15 may be structured of one roller or two rollers divided in the right and left direction. Further, the shutter member 15 may be structured of four or more rollers divided in the right and left direction. Further, in the embodiment described above, three rollers structuring the shutter member 15 are held by the shaft 81 so as to be contacted with each other in the right and left direction. However, the three rollers structuring the shutter member 15 may be held by the shaft 81 in a separated state with a predetermined space therebetween in the right and left direction. In this case, a width of each of the rollers is set as follows and the rollers are disposed at predetermined positions so that, in a case that a card 2 is inserted into the insertion port 3 so that a longitudinal direction of the card 2 is coincided with the front and rear direction, even when the card 2 has been inserted at any position in the right and left direction, the inserted card 2 is contacted with at least one of three rollers structuring the shutter member 15.

In the embodiment described above, the shutter member 15 is a roller which is capable of rotating with the right and left direction as an axial direction of rotation. However, the present invention is not limited to this embodiment. For example, the shutter member 15 may be a block-shaped guide member which is capable of swinging with the right and left direction as an axial direction of swinging. Further, the shutter member 15 may be a block-shaped guide member which is fixed to the shaft holding member 82 or is integrally formed with the shaft holding member 82. In this case, the shutter member 15 is, for example, formed of resin material which is excellent in slidability.

In the embodiment described above, the abutting member 84 is disposed on an upper side with respect to the shutter member 15. However, the present invention is not limited to this embodiment. For example, instead of the abutting member 84, another shutter member which is movable between a closed position closing the conveying passage 5 and an open position opening the conveying passage 5 and is urged to a lower side by an urging member such as a spring may be disposed on an upper side with respect to the shutter member 15. In this case, for example, the card insertion part 4 includes a sensor for detecting that the shutter member has been moved to the open position. However, in comparison with a case that another shutter member is disposed on an upper side with respect to the shutter member 15, when the abutting member 84 is disposed on an upper side with respect to the shutter member 15, the structure of the card reader 1 can be simplified. Further, in the embodiment described above, the shutter member 15 located at the open position is retreated to a lower side with respect to the conveying passage 5 but the shutter member 15 located at the open position may be retreated to an upper side with respect to the conveying passage 5. Further, in the embodiment described above, the shutter member 14 located at the open position is retreated to a lower side with respect to the conveying passage 5 but the shutter member 14 located at the open position may be retreated to an upper side with respect to the conveying passage 5.

In the embodiment described above, the shutter member 15 located at the second open position is retreated to a lower side with respect to the conveying passage 5. However, the present invention is not limited to this embodiment. For example, the shutter member 15 located at the second open position may be retreated to an upper side with respect to the conveying passage 5. Further, in the embodiment described above, the shutter member 14 located at the first open position is retreated to a lower side with respect to the conveying passage 5 but the shutter member 14 located at the first open position may be retreated to an upper side with respect to the conveying passage 5.

In the embodiment described above, the insertion detection mechanism 16 is structured of the detection lever 88, the optical sensor 89 and the like. However, the present invention is not limited to this embodiment. For example, the insertion detection mechanism 16 may be structured of the detection lever 88, a micro switch for detecting an operation of the detection lever 88, and the like. Further, the insertion detection mechanism 16 may be structured of an optical sensor having a light emitting element and a light receiving element which are disposed in the upper and lower direction so as to interpose the conveying passage 5 where a card 2 is passed, or the like. Alternatively, the insertion detection mechanism 16 may be structured of a micro switch or the like which is disposed at a position where an end part in the longitudinal direction of a card 2 is contacted. Further, the sensor 85 may be structured of a micro switch or the like.

In the embodiment described above, the magnetic sensors 17 and 18 are disposed in the right and left direction at the positions avoiding an embossing area 2c of a card 2 inserted so that a short widthwise direction of the card 2 is coincided with the front and rear direction. However, the present invention is not limited to this embodiment. For example, the magnetic sensors 17 and 18 may be disposed at positions overlapping in the upper and lower direction with an embossing area 2c of a card 2 inserted so that a short widthwise direction of the card 2 is coincided with the front and rear direction.

Further, in the embodiment described above, the magnetic sensors 17 and 18 are disposed so that the magnetic sensor 17 and the magnetic sensor 18 are completely overlapped with each other when viewed in the upper and lower direction. However, the magnetic sensors 17 and 18 may be disposed so that a part of the magnetic sensor 17 and a part of the magnetic sensor 18 are overlapped with each other when viewed in the upper and lower direction. Further, the magnetic sensors 17 and 18 may be disposed so that the magnetic sensors 17 and 18 may be displaced from each other when viewed in the upper and lower direction. Further, in the embodiment described above, the card insertion part 4 includes two magnetic sensors 17 and 18, but the card insertion part 4 may include only one of two magnetic sensors 17 and 18.

In the embodiment described above, the card conveying mechanism 6 is structured of the conveying rollers 31 through 33 and the pad rollers 34 through 36. However, the present invention is not limited to this embodiment. For example, the card conveying mechanism 6 may be structured of a belt for abutting with an upper face or an under face of a card 2 to convey the card 2. Further, the card conveying mechanism 6 may be structured of a holding mechanism for holding a card 2, a moving mechanism for moving the holding mechanism in the front and rear direction, and the like.

In the embodiment described above, a card 2 is a rectangular card made of vinyl chloride whose thickness is about 0.7-0.8 mm. However, the present invention is not limited to this embodiment. For example, the card 2 may be a PET (polyethylene terephthalate) card whose thickness is about 0.18-0.36 mm or may be a paper card having a predetermined thickness. Further, the card 2 may be provided with no built-in IC chip. In this case, the card reader 1 may be provided with no IC contact block 9, no metal sensor 19 and the like. Further, in this case, for example, based on a difference between detection timings of the magnetic sensors 17 and 18 and detection timings of the sensor 85 and/or the sensor 89, it can be detected whether a card 2 has been inserted from one end 2d side of the card 2, or the card 2 has been inserted from the other end 2e side of the card 2. Further, the card reader 1 may include no magnetic sensors 17 and 18.

In the embodiment described above, a magnetic stripe 2a is formed on a rear face of the card 2. However, the present invention is not limited to this embodiment. For example, a magnetic stripe may be formed on a front face of the card 2 instead of a rear face of the card 2 or in addition to the rear face of the card 2. For example, a magnetic stripe in conformity with the standard of JISX6302 may be formed on a front face of the card 2. In a case that a magnetic stripe is formed on only a front face of the card 2, the magnetic head 7 is disposed on an upper side with respect to the conveying passage 5. Further, in a case that a magnetic stripe is formed on a front face of the card 2 in addition to the magnetic stripe 2a, the magnetic head 7 is disposed on both of an upper side and a lower side relative to the conveying passage 5.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card formed in a substantially rectangular shape which is conveyed in a short widthwise direction of the card and is processed, the card reader comprising:
   a card insertion part which is formed with an insertion port for the card; and
   a conveying passage for the card which is connected with the insertion port;
   wherein the card insertion part comprises:
      a shutter member which is disposed on a rear side with respect to the insertion port in a taking-in direction of the card and is movable between a closed position where the conveying passage is closed and an open position where the conveying passage is opened; and
      a protruding member which is attached to the shutter member and is protruded from the shutter member to an insertion port side;
   wherein an insertion port side of the protruding member is formed with a card abutting face configured to abut with the card; and
   wherein a distance between the insertion port and the card abutting face in a conveying direction of the card is set to be shorter than a width in the short widthwise direction of the card.

2. The card reader according to claim 1, wherein the shutter member located at the closed position is structured to close the conveying passage over an entire region of the conveying passage in a widthwise direction of the conveying passage which is perpendicular to the conveying direction of the card.

3. The card reader according to claim 1, wherein a plurality of protruding members are disposed in a separated state with a predetermined distance therebetween in a widthwise direction of the conveying passage which is perpendicular to the conveying direction of the card.

4. The card reader according to claim 1, wherein the card insertion part comprises:
   a first insertion detection mechanism which is disposed on the insertion port side relative to the shutter member and is structured to detect the card inserted into the insertion port so that a short widthwise direction of the card is coincided with the conveying direction of the card by detecting both ends of the card in a widthwise direction of the conveying passage which is perpendicular to the conveying direction of the card; and
   a second insertion detection mechanism which is disposed on the insertion port side relative to the shutter member and structured to detect the card inserted into the insertion port by contacting with a front face and/or a rear face of the card.

5. The card reader according to claim 1, wherein the card insertion part comprises:
   a magnetic detection mechanism which is disposed on the insertion port side relative to the shutter member and structured to detect that magnetic data are recorded on the card; and
   a metal detection mechanism which is disposed on the insertion port side relative to the shutter member and structured to detect an external connection terminal of an IC chip which is fixed to the card.

6. The card reader according to claim 1, further comprising a card conveying mechanism structured to convey the card,
   wherein the card conveying mechanism includes a conveying roller which is disposed on the insertion port side relative to the shutter member.

7. The card reader according to claim 1, wherein the shutter member is moved between the closed position and the open position by a shutter drive mechanism;
   the card abutting face is configured to prevent the card from being further inserted when the shutter member is located at the closed position;
   when the card is abutted with the card abutting face, further insertion of the card is prevented at a position where a part of the card is protruded out from the insertion port; and
   wherein when a normal card is inserted, the shutter member is moved from the closed position to the open position by the shutter drive mechanism and thereby the protruding member attached to the shutter member is also retreated from the conveying passage to allow the normal card to be taken into an inside of the card reader.

8. A card reader for use with a card formed in a substantially rectangular shape which is conveyed in a short widthwise direction of the card and is processed, the card reader comprising:
   a card insertion part which is formed with an insertion port for the card; and
   a conveying passage for the card which is connected with the insertion port;
   wherein the card insertion part comprises:
      an insertion detection mechanism structured to detect the card inserted into the insertion port so that a short widthwise direction of the card is coincided with a conveying direction of the card by detecting both ends of the card in a widthwise direction of the conveying passage which is perpendicular to the conveying direction of the card;
      a card contact member structured to protrude to and retreat from the conveying passage and structured to contact with a front face or a rear face of the card; and
      a contact member sensor structured to detect a protruding-retreating state of the card contact member to and from the conveying passage; and
   wherein the card contact member is disposed at a position where, in a case that the card has been inserted into the insertion port so that a longitudinal direction of the card is coincided with the conveying direction of the card, the card contact member is contacted with the card having been inserted even when the card is inserted at any position in the widthwise direction of the conveying passage.

9. The card reader according to claim 8, wherein the card insertion part includes a magnetic sensor structured to detect magnetic data recorded on the card.

10. The card reader according to claim 9, wherein the card insertion part includes the magnetic sensor which is disposed at least one side with respect to the conveying passage in a thickness direction of the card which is perpendicular to the conveying direction of the card and the widthwise direction of the conveying passage.

11. The card reader according to claim 10, wherein the card insertion part includes the two magnetic sensors which are disposed in the thickness direction of the card so as to interpose the card.

12. The card reader according to claim 11, wherein
   the card is defined with an embossing area where embossing is performed, and
   the two magnetic sensors are disposed at positions avoiding the embossing area in the widthwise direction of the conveying passage.

13. The card reader according to claim 8, wherein the card insertion part includes a metal sensor structured to detect an external connection terminal of an IC chip fixed to the card.

14. The card reader according to claim 8, wherein
   the insertion detection mechanism comprises:
      a second card contact member structured to protrude to and retreat from the conveying passage and is configured to contact with an end part of the card in the widthwise direction of the conveying passage; and
      a second contact member sensor structured to detect a protruding-retreating state of the second card contact member to and from the conveying passage; and
   the card contact member and the second card contact member are disposed at substantially the same position as each other in the card conveying direction.

15. A card reader for use with a card formed in a substantially rectangular shape which is conveyed in a short widthwise direction of the card and is processed, the card reader comprising:
   a card insertion part which is formed with an insertion port for the card; and
   a conveying passage for the card which is connected with the insertion port;
   wherein the card insertion part comprises:
      an insertion detection mechanism structured to detect the card inserted into the insertion port so that a short widthwise direction of the card is coincided with a conveying direction of the card by detecting both ends of the card in a widthwise direction of the conveying passage which is perpendicular to the conveying direction of the card;
      a card contact member structured to protrude to and retreat from the conveying passage and is structured to contact with a front face or a rear face of the card; and
      a contact member sensor structured to detect a protruding-retreating state of the card contact member to and from the conveying passage; and
   wherein a width of the card contact member in the widthwise direction of the conveying passage is set so that, in a case that the card has been inserted into the insertion port so that a longitudinal direction of the card is coincided with the conveying direction of the card, the card having been inserted is contacted with the card contact member even when the card is inserted at any position in the widthwise direction of the conveying passage.

16. A card reader for use with a card formed in a substantially rectangular shape which is conveyed in a short widthwise direction of the card and is processed, the card reader comprising:

a card insertion part which is formed with an insertion port for the card; and a conveying passage for the card which is connected with the insertion port;

wherein the card insertion part comprises:

a first shutter member which is disposed on a rear side with respect to the insertion port in a taking-in direction of the card and is movable between a first closed position where the conveying passage is closed and a first open position where the conveying passage is opened;

a shutter drive mechanism structured to drive the first shutter member between the first closed position and the first open position;

a second shutter member which is disposed on an insertion port side relative to the first shutter member and is movable between a second closed position where the conveying passage is closed and a second open position where the conveying passage is opened; and an urging member which urges the second shutter member toward the second closed position;

wherein the second shutter member is provided separately from the first shutter member, and the second shutter member is structured to move independently of the first shutter member, and wherein the second shutter member is moved to the second open position when the card inserted into the insertion port is contacted.

17. The card reader according to claim 16, wherein the second shutter member is a roller which is rotatable with a widthwise direction of the conveying passage perpendicular to the conveying direction of the card as an axial direction of rotation.

18. The card reader according to claim 16, wherein the card insertion part comprises an abutting member with which the second shutter member located at the second closed position is abutted, the abutting member is disposed on one side with respect to the conveying passage in a thickness direction of the card which is perpendicular to the conveying direction of the card and a widthwise direction of the conveying passage perpendicular to the conveying direction of the card, and the second shutter member is retreated to the other side with respect to the conveying passage in the thickness direction of the card at the second open position and is urged toward the abutting member by the urging member.

19. The card reader according to claim 18, wherein the abutting member is disposed on an upper side with respect to the conveying passage, the second shutter member is retreated to a lower side with respect to the conveying passage at the second open position, and an opening part communicating with an outside of the card reader is formed on a lower side of the card insertion part with respect to the second shutter member.

20. The card reader according to claim 16, wherein the card insertion part comprises a shutter member sensor structured to detect the second shutter member moved to the second open position.

21. The card reader according to claim 20, wherein the second shutter member is disposed at a position where, in a case that the card has been inserted into the insertion port so that a longitudinal direction of the card is coincided with the conveying direction of the card, the card having been inserted is contacted with the second shutter member even when the card is inserted at any position in a widthwise direction of the conveying passage perpendicular to the conveying direction of the card.

22. The card reader according to claim 20, wherein a width of the second shutter member in the widthwise direction of the conveying passage perpendicular to the conveying direction of the card is set so that, in a case that the card has been inserted into the insertion port so that a longitudinal direction of the card is coincided with the conveying direction of the card, the card having been inserted is contacted with the second shutter member even when the card is inserted at any position in the widthwise direction of the conveying passage.

23. The card reader according to claim 20, wherein the shutter drive mechanism drives the first shutter member based on a detected result of the shutter member sensor.

24. The card reader according to claim 16, wherein the card insertion part comprises a protruding member which is attached to the first shutter member and is protruded from the first shutter member to an insertion port side;

an insertion port side of the protruding member is formed with a card abutting face configured to abut with the card; and a distance between the insertion port and the card abutting face in the conveying direction of the card is set to be shorter than a width in the short widthwise direction of the card.

* * * * *